(12) United States Patent
Saito et al.

(10) Patent No.: US 11,679,422 B2
(45) Date of Patent: Jun. 20, 2023

(54) ON-BOARD SENSOR CLEANING DEVICE

(71) Applicant: DENSO CORPORATION, Kariya (JP)

(72) Inventors: Keita Saito, Kariya (JP); Yukihiro Matsushita, Kariya (JP)

(73) Assignee: DENSO CORPORATION, Kariya (JP)

( * ) Notice: Subject to any disclaimer, the term of this patent is extended or adjusted under 35 U.S.C. 154(b) by 520 days.

(21) Appl. No.: 16/628,242

(22) PCT Filed: May 23, 2018

(86) PCT No.: PCT/JP2018/019808
§ 371 (c)(1),
(2) Date: Jan. 2, 2020

(87) PCT Pub. No.: WO2019/035255
PCT Pub. Date: Feb. 21, 2019

(65) Prior Publication Data
US 2020/0298283 A1 Sep. 24, 2020

(30) Foreign Application Priority Data

Aug. 15, 2017 (JP) .............................. JP2017-156863
Aug. 31, 2017 (JP) .............................. JP2017-166721
Feb. 7, 2018 (JP) .............................. JP2018-020077

(51) Int. Cl.
B08B 3/02 (2006.01)
B08B 5/02 (2006.01)
B60S 1/52 (2006.01)
B60S 1/56 (2006.01)
G02B 27/00 (2006.01)

(52) U.S. Cl.
CPC .................. *B08B 3/02* (2013.01); *B08B 5/02* (2013.01); *B60S 1/52* (2013.01); *B60S 1/56* (2013.01); *G02B 27/0006* (2013.01)

(58) Field of Classification Search
CPC ......... G02B 27/0006; B08B 5/02; B08B 3/02; B60S 1/522; B60S 1/52; B60S 1/56
See application file for complete search history.

(56) References Cited

U.S. PATENT DOCUMENTS 4,905,909 A 3/1990 Woods
4,955,547 A 9/1990 Woods
(Continued)

FOREIGN PATENT DOCUMENTS

EP 3 141 441 A1 3/2017
JP S62-278305 A 12/1987
(Continued)

OTHER PUBLICATIONS

Aug. 28, 2018 International Search Report issued in International Patent Application No. PCT/JP2018/019808.

*Primary Examiner* — Benjamin L Osterhout
(74) *Attorney, Agent, or Firm* — Oliff PLC

(57) ABSTRACT

An on-board sensor cleaning device is provided for an on-board sensor including a sensing surface. The on-board sensor cleaning device includes an ejection port that ejects fluid toward the sensing surface when the ejection port is disposed outside a sensing range of the on-board sensor. The on-board sensor cleaning device further includes a movable nozzle configured to move the ejection port so that a position of an ejection axis of the ejection port changes.

26 Claims, 14 Drawing Sheets

(56) References Cited

U.S. PATENT DOCUMENTS

| | | | |
|---|---|---|---|
| 5,708,859 A | 1/1998 | Tajima et al. | |
| 2015/0040953 A1* | 2/2015 | Kikuta | B60S 1/56 |
| | | | 134/123 |
| 2015/0138357 A1* | 5/2015 | Romack | H04N 5/23203 |
| | | | 348/148 |
| 2015/0183406 A1 | 7/2015 | Tanaka et al. | |
| 2016/0339875 A1* | 11/2016 | Ina | B60S 1/522 |
| 2017/0036647 A1* | 2/2017 | Zhao | B05B 1/04 |
| 2017/0036650 A1 | 2/2017 | Hester et al. | |
| 2017/0136472 A1 | 5/2017 | Gopalan et al. | |
| 2017/0313286 A1* | 11/2017 | Galera | B08B 3/02 |

FOREIGN PATENT DOCUMENTS

| | | |
|---|---|---|
| JP | H09-148295 A | 6/1997 |
| JP | H09-292656 A | 11/1997 |
| JP | 2014-19403 A | 2/2014 |
| JP | 2015-29956 A | 2/2015 |
| JP | 2017-513772 A | 6/2017 |

* cited by examiner

ON-BOARD SENSOR CLEANING DEVICE

TECHNICAL FIELD

The present disclosure relates to an on-board sensor cleaning device.

BACKGROUND ART

A typical known on-board sensor cleaning device ejects liquid toward a front surface of an optical surface (sensing surface) of an on-board optical sensor to remove objects from the optical surface (for example, refer to patent document 1).
In such an on-board sensor cleaning device, a nozzle is disposed to oppose the optical surface and eject liquid toward the optical surface while moving along the optical surface. Thus, satisfactory cleaning characteristics are obtained.

PRIOR ART DOCUMENT

Patent Document

Patent Document 1: European Patent Application Publication No. 3141441

SUMMARY OF THE INVENTION

Problems that the Invention is to Solve

In an on-board sensor cleaning device such as that described above, when the nozzle is opposed to the optical surface, or sensing surface, the nozzle moves along the optical surface. This may obstruct sensing performed by the on-board optical sensor.
It is an object of the present disclosure to provide an on-board sensor cleaning device that limits effects on sensing performed by an on-board sensor.

Means for Solving the Problems

To achieve the above object, an aspect of the present disclosure is an on-board sensor cleaning device provided for an on-board sensor including a sensing surface. The on-board sensor cleaning device includes an ejection port that ejects fluid toward the sensing surface when the ejection port is disposed outside a sensing range of the on-board sensor. The on-board sensor cleaning device further includes a movable nozzle configured to move the ejection port so that a position of an ejection axis of the ejection port changes.

MODES FOR CARRYING OUT THE INVENTION

First Embodiment

Figure 1:
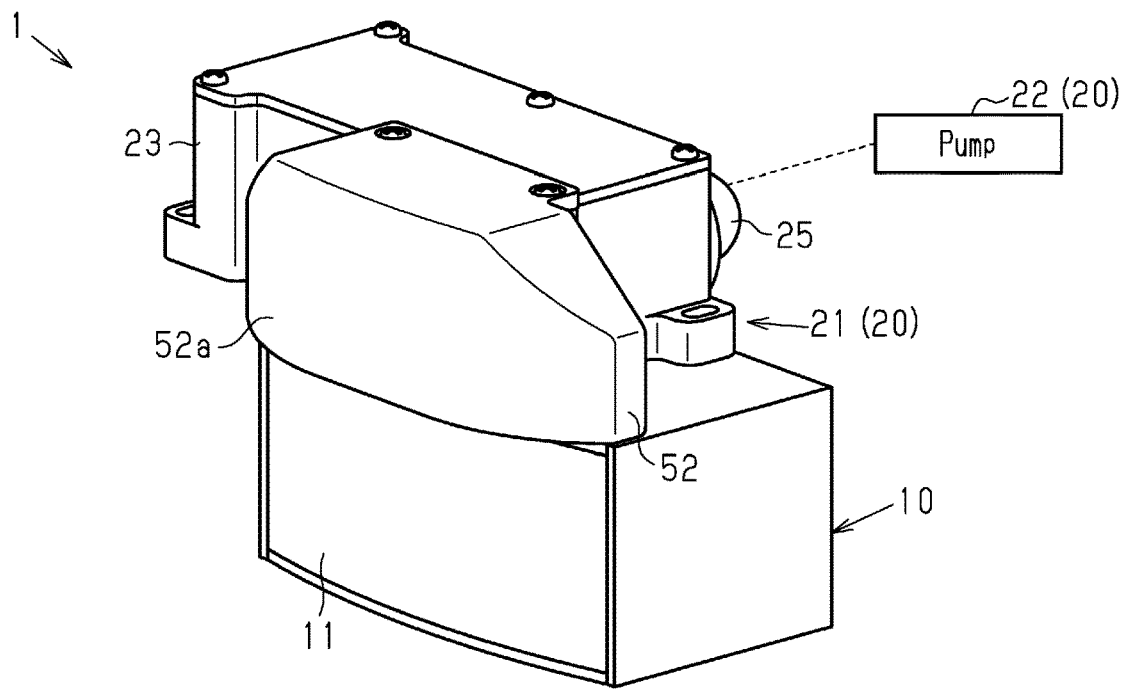
FIG. 1 is a perspective view of a sensor system including a first embodiment of an on-board sensor cleaning device.
Figure 2:
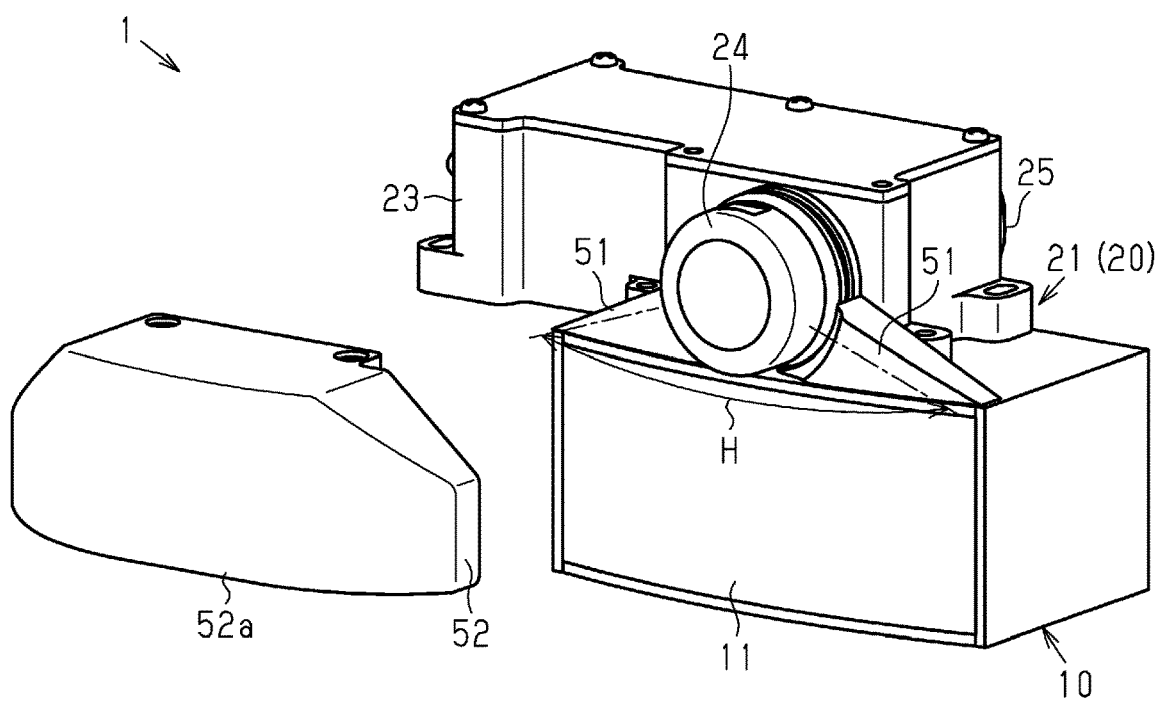
FIG. 2 is a perspective view of the sensor system shown in FIG. 1 with the cover removed.

A first embodiment of an on-board sensor cleaning device will now be described.
As shown in FIG. 1, the present embodiment of a sensor system 1 includes an on-board optical sensor 10, which corresponds to an on-board sensor, and an on-board sensor cleaning device 20 mounted on the on-board optical sensor 10 to clean an optical surface 11 (sensing surface) of the on-board optical sensor 10.
The on-board optical sensor 10 is a sensor (such as a lidar-type sensor) that outputs (emits light of) an infrared laser beam and receives scattered light reflected from an object to measure the distance to the object and includes the optical surface 11, which corresponds to a sensing surface that allows for transmission of laser beams. In the description below, the side toward which the optical surface 11 faces is referred to as a front side, and the opposite side is referred to as a rear side. In addition, the direction in which the on-board optical sensor 10 is mounted on the on-board sensor cleaning device 20 is referred to as the upper-lower direction or the vertical direction, and the direction that is orthogonal to the upper-lower direction and the front-rear direction is referred to as the sideward direction, unless otherwise specified.

The optical surface 11 is bulged frontward and is curved as viewed in the upper-lower direction.

As shown in FIG. 1, the on-board sensor cleaning device 20 includes a nozzle unit 21 mounted on an upper side (vertical upper side of) the on-board optical sensor 10 and a pump 22 (fluid pump) that supplies fluid to the nozzle unit 21.

As shown in FIGS. 1 to 4, the nozzle unit 21 includes a housing 23, a nozzle 24, a connector 25 disposed between the nozzle 24 and the pump 22, and a driver 26 accommodated in the housing 23. The nozzle 24, which corresponds to a movable nozzle, is at least partially exposed frontward from the housing 23.

Figure 3:
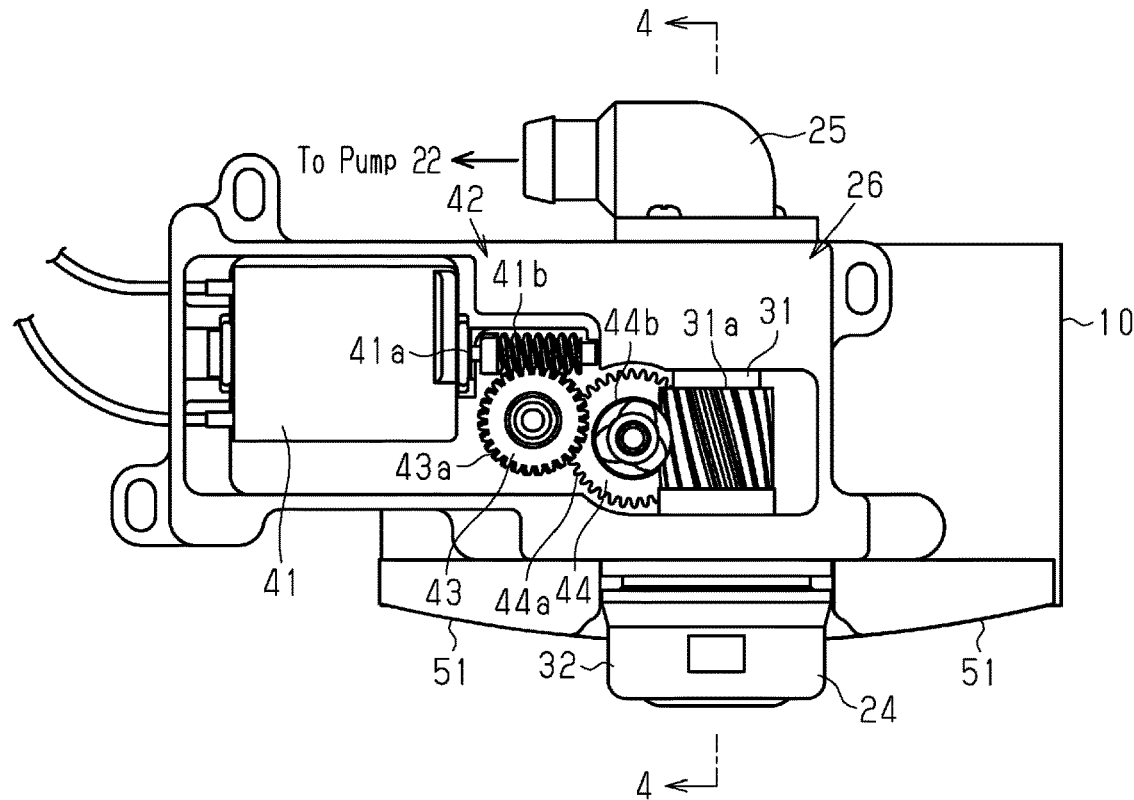
FIG. 3 is a plan view of a driver shown in FIG. 1.
Figure 4:
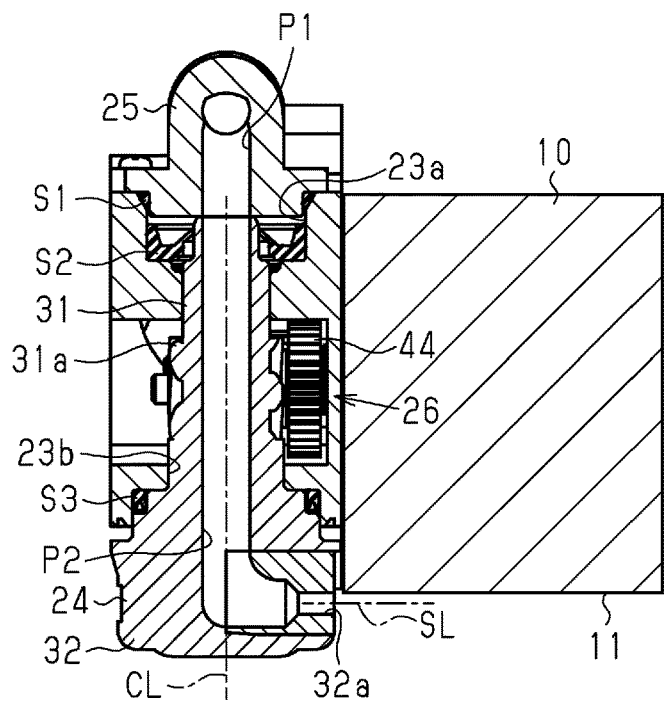
FIG. 4 is a cross-sectional view taken along line 4-4 in FIG. 3.

As shown in FIGS. 3 and 4, when a portion of the connector 25 is inserted into a through hole 23a that extends in a rear portion of the housing 23, the connector 25 is fastened with a screw. The connector 25 is connected to the pump 22 by, for example, a hose (not shown) so that air supplied from the pump 22 is allowed to flow into a flow passage P1 that extends in the connector 25. The flow passage P1 of the connector 25 is configured to be bent into an L-shaped in the connector 25.

As shown in FIG. 4, the connector 25 is provided with an annular seal member S1 located in the through hole 23a. This limits entrance of water or the like from the through hole 23a.

As shown in FIGS. 3 and 4, the nozzle 24 includes a tubular portion 31 extending in the front-rear direction and a discoid (cylindrical) body 32 disposed at a front side of the tubular portion 31 and having a larger diameter than the tubular portion 31. The tubular portion 31 of the nozzle 24 is pivotally supported in a state inserted through two insertion holes 23a and 23b that extend in front and rear portions of the housing 23 at a front side of the connector 25. The body 32 and the tubular portion 31 configure a single-piece component. The body 32 includes an ejection port 32a configured to eject air (gas) supplied from the pump 22.

The nozzle 24 is entirely located above the on-board optical sensor 10 (optical surface 11) so that the nozzle 24 is not opposed to the optical surface 11.

A flow passage P2 extends in the nozzle 24 through the tubular portion 31 and the body 32. When the rear portion of the tubular portion 31 is opposed to the front of the connector 25, the flow passage P1 of the connector 25 is connected to the flow passage P2 of the nozzle 24. Thus, the gas (air) supplied from the pump 22 flows through the flow passage P1 of the connector 25 and the flow passage P2 of the nozzle 24 and is ejected from the ejection port 32a of the body 32 of the nozzle 24. The flow passage P2 of the nozzle 24 is bent into an L-shaped in the body 32 so that the ejection port 32a is directed toward a vertical lower side.

The rear end of the tubular portion 31 is provided with an annular seal member S2 that seals the gap between the tubular portion 31 and the through hole 23a. A front side of the tubular portion 31 is provided with a seal member S3 that seals the gap between the tubular portion 31 and the through hole 23b. This limits entrance of water or the like from the gap between the tubular portion 31 and the wall of each of the through holes 23a and 23b.

As shown in FIG. 3, the driver 26, which corresponds to a pivot mechanism, includes a motor 41 and a speed reduction mechanism 42 accommodated in the housing 23 and uses rotational driving power of the motor 41 to pivot (swing) the nozzle 24 exposed from the housing 23.

As shown in FIG. 3, the speed reduction mechanism 42 includes a worm 41b, a first gear 43, a second gear 44, and a worm wheel 31a. The worm 41b is formed on an output shaft 41a of the motor 41 and engages a worm wheel 43a of the first gear 43. The worm 41b (output shaft 41a of motor 41) extends in the sideward direction, that is, the width-wise direction of the on-board optical sensor 10. This limits increases in the size of the on-board sensor cleaning device 20 in the front-rear direction, that is, the sensing axial direction (detection direction) of the on-board optical sensor 10.

The first gear 43, which engages the worm 41b, includes a spur gear (not shown) configured to be integral with the worm wheel 43a and rotate coaxially with the worm wheel 43a. The spur gear of the first gear 43 engages a spur gear 44a of the second gear 44. The second gear 44 includes a worm 44b configured to be integral with the spur gear 44a and rotate coaxially with the spur gear 44a. The worm 44b engages the worm wheel 31a, which is formed on the outer circumferential surface of the tubular portion 31 of the nozzle 24. With this configuration, rotational driving power of the motor 41 is changed to low-speed high torque by the speed reduction mechanism 42 and transmitted to the tubular portion 31 of the nozzle 24 so that the tubular portion 31 pivots. This causes the body 32, which is the single-piece component with the tubular portion 31, to pivot and change the direction of the ejection port 32a. At this time, the nozzle 24 reciprocally swings in a predetermined range H (refer to FIG. 2) of the optical surface 11 at a substantially constant speed. In other words, forward and reverse rotations of the motor 41 are switched. The nozzle 24 is configured to pivot about a center axis CL (pivot axis) of the tubular portion 31. The center axis CL of the tubular portion 31 coincides with the center axis of the flow passage P2 of the tubular portion 31. More specifically, the flow passage P2 is set on the center axis CL, that is, the pivot center of the tubular portion 31.

Guide walls 51 are disposed at opposite sides of the nozzle 24 in the sideward direction in the vicinity of a pivoting direction of the nozzle 24 and are flush with the optical surface 11. Each guide wall 51 has a front surface that is curved to have substantially the same curvature as the optical surface 11. Each guide wall 51 is configured to be tapered as the guide wall 51 extends away from the nozzle 24. The guide wall 51 has a triangular front surface. The guide wall 51 has a lower end that is parallel to the upper edge of the optical surface 11. The lower end is configured to be located at substantially the same position as the nozzle 24 in the vertical direction. The vertical dimension of the guide wall 51 in the vicinity of the nozzle 24 is substantially the same as the radius of the body 32 of the nozzle 24.

A nozzle cover 52 is disposed in front of the nozzle 24 to cover the nozzle 24 and limit exposure of the nozzle 24 to the exterior. The nozzle cover 52 is coupled to the housing 23 by a screw. Different means such as snap-fit may be used to couple the nozzle cover 52. The nozzle cover 52 is configured to include, for example, a front cover portion 52a curved to have substantially the same curvature as the optical surface 11 and covering the nozzle 24. Thus, the distance between the front cover portion 52a and the optical surface 11 in a direction orthogonal to the optical surface 11 is substantially the same throughout in the circumferential direction (curving direction).

For example, a centrifugal pump may be used as the pump 22. The configuration of the pump 22 will now be described with reference to FIG. 5.

Figure 5:
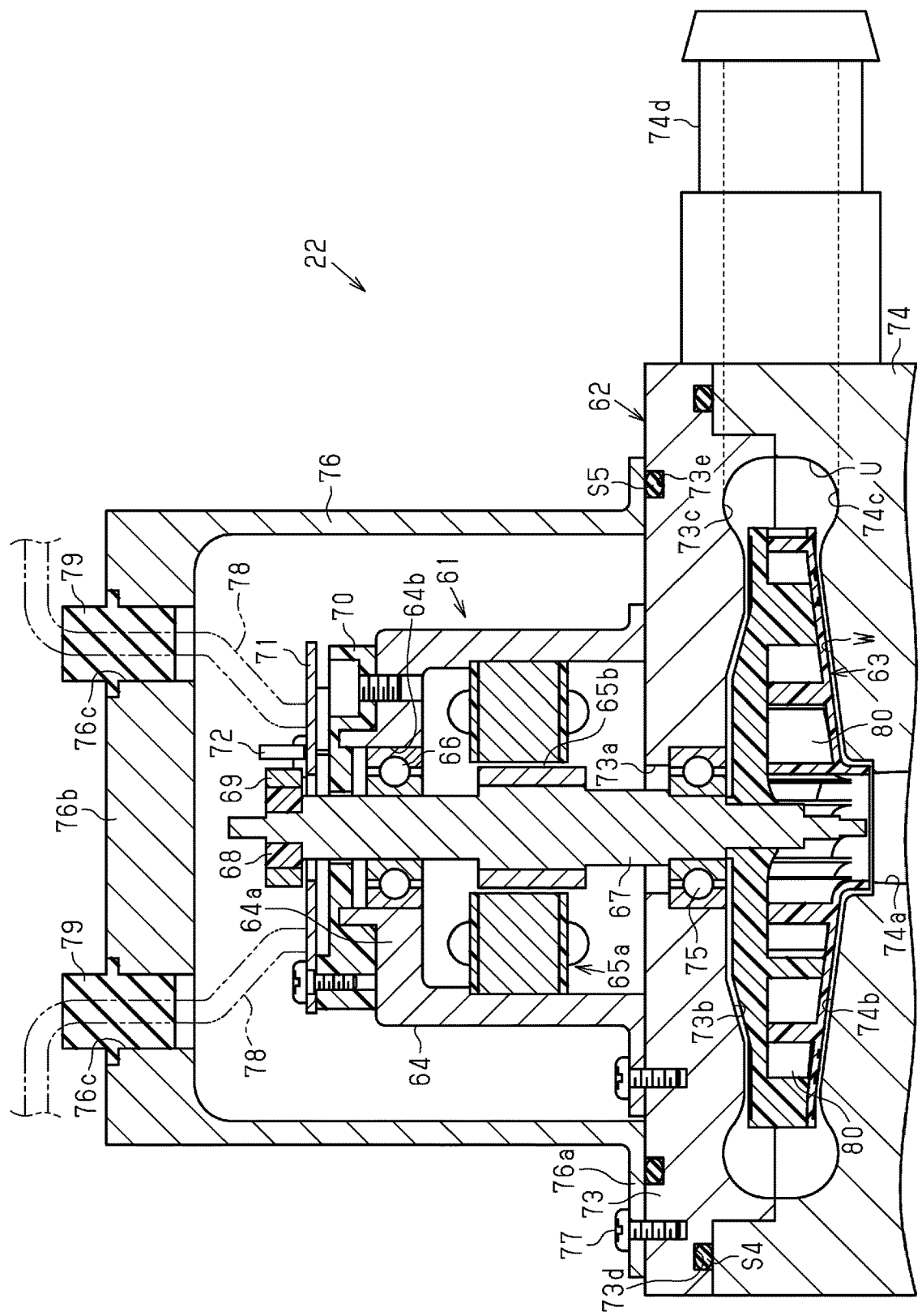
FIG. 5 is a cross-sectional view of a pump shown in FIG. 1.

As shown in FIG. 5, the pump 22 of the present embodiment is an air pump and includes a motor 61, a pump case 62, and an impeller 63.

The motor 61 is, for example, a blushless motor and includes a tubular motor case 64 having a substantially closed end, a stator 65a fixed to an inner surface of the motor case 64, and a rotor 65b rotationally supported at an inner side of the stator 65a. The motor 61 of the present embodiment is configured so that the rotor 65b has four magnetic poles and the stator 65a has six slots between teeth.

A center hole 64b extends through the center of a wall end 64a (in FIG. 5, upper portion) of the motor case 64. A bearing 66 is disposed in the center hole 64b to support the basal side (in FIG. 5, upper end side (portion located toward wall end 64a)) of a rotation shaft 67 of the rotor 65b. The rotation shaft 67 includes a basal end (in FIG. 5, upper end (end located toward wall end 64a)) projecting out of the motor case 64. An annular sensor magnet 69 is fixed to the basal end with a plastic fixing ring 68 disposed in between. A circuit board 71 is fixed to the wall end 64a of the motor case 64 with a fixing member 70 located in between. Various elements including a rotation sensor 72 are mounted on the circuit board 71. The rotation sensor 72 is opposed to the sensor magnet 69 to detect rotation (e.g., rotation angle, rotation speed) of the rotation shaft 67.

The pump case 62 includes a first case 73 fixed to substantially close the open end of the motor case 64 and a second case 74 fixed to a side of the first case 73 opposite to the motor 61 (motor case 64).

A center hole 73a extends in the center of the first case 73. The rotation shaft 67 includes a distal end side (portion located toward pump case 62) supported by a bearing 75 on the wall surface of the center hole 73a. The first case 73 has an end surface located toward the second case 74 and including a recess 73b that is circular as viewed in the axial direction of the rotation shaft 67. The end surface of the first case 73 located toward the second case 74 further includes a swirl chamber defining groove 73c located at an outer circumferential side of the recess 73b.

The center of the second case 74 includes an air inlet 74a. The air inlet 74a extends through the second case 74 in the axial direction of the rotation shaft 67 and has a diameter that decreases toward the motor 61 (first case 73). The second case 74 has an end surface that is located toward the first case 73 and includes a recess 74b that is circular as viewed in the axial direction of the rotation shaft 67. The recess 74b and the recess 73b of the first case 73 configure an impeller retainer W. The end surface of the second case 74 located toward the first case 73 further includes a swirl chamber defining groove 74c located at an outer circumferential side of the recess 74b. The swirl chamber defining groove 74c and the swirl chamber defining groove 73c of the first case 73 configure a swirl chamber U. The second case 74 has a circumferential portion including an air discharge tube 74d that is connected to the swirl chamber U located at a radially outer side of the impeller retainer W.

The first case 73 has a surface contacting the second case 74 and including an annular seal groove 73d at a radially outer side of the swirl chamber U. The seal groove 73d accommodates an annular seal member S4 that is compressed and held by a contact surface of the second case 74. This limits leakage of fluid (air) flowing through the swirl chamber U from the contact surfaces.

In addition, a tubular hermetic case 76 having a substantially closed end is fixed to the first case 73 to entirely cover the motor 61. The hermetic case 76 includes a flange 76a extending radially outward from its open end. Screws 77 extend through the flange 76a and are coupled to the first case 73 so that the flange 76a is fastened at multiple locations (in FIG. 5, only one location is shown). The first case 73 has a surface contacting the flange 76a and including an annular seal groove 73e. The seal groove 73e accommodates an annular seal member S5 that is compressed and held by the contact surface of the flange 76a. This limits leakage of fluid (air) from the contact surfaces of the first case 73 and the flange 76a. The hermetic case 76 includes a wall end 76b including wire holes 76c. Rubber seal members 79 are fitted into the wire holes 76c to prevent leakage of air from the wire holes 76c while allowing wires 78 to extend through. The wires 78 electrically connect an external control device or a power supply device to the circuit board 71 or the winding of the stator 65a.

The impeller 63 is fixed to the distal end (end located toward pump case 62) of the rotation shaft 67 projecting into the impeller receptacle W in an integrally rotational manner and is located in the impeller retainer W. The impeller 63 includes multiple flow passages 80 that connect an inner cavity located in the axial center to an outer cavity (swirl chamber U) located radially outward. The impeller 63 is rotated to draw in air, which corresponds to fluid, from the air inlet 74a and discharge the air from the inner cavity to the outer cavity (swirl chamber U) through the flow passages 80. Ultimately, the fluid (air) is continuously ejected from the air discharge tube 74d. When the air discharge tube 74d is connected to the connector 25 of the nozzle unit 21 via a hose (not shown), the supplied fluid is continuously ejected from the nozzle 24 (ejection port 32a).

The operation of the on-board sensor cleaning device 20 will now be described. In the present embodiment, the nozzle unit 21 of the on-board sensor cleaning device 20 is disposed at a vertical upper side of the on-board optical sensor 10. When the pump 22 is driven, air is supplied from the pump 22 and continuously ejected from the ejection port 32a of the nozzle 24 through the flow passages P1 and P2.

In addition, the on-board sensor cleaning device 20 of the present embodiment is configured to drive and rotate the motor 41 so that the rotational driving power is transmitted to the nozzle 24 via the speed reduction mechanism 42 and the nozzle 24 pivots. The motor 41 is configured to forwardly and reversely rotate so that an ejection axis SL of the nozzle 24 reciprocally swings over the optical surface 11.

In the on-board sensor cleaning device 20 of the present embodiment, the nozzle 24 is disposed at a position (vertical upper side) separated from a position opposing the optical surface 11. Thus, even when the nozzle 24 pivots to change the position of that the ejection axis SL of the nozzle 24, the nozzle 24 will not be disposed on the optical surface 11. This limits the effect of the on-board sensor cleaning device 20 on the sensing.

The advantages of the present embodiment will now be described.

(1) When the nozzle 24 is disposed at a position that does not oppose the optical surface 11 (position outside sensing range), the nozzle 24 rotates about the center axis CL, which corresponds to the pivot axis extending in a direction orthogonal to the optical surface 11, and ejects air toward the optical surface 11. Thus, the nozzle 24 will not enter the sensing range, so that the effect on the sensing is limited. In addition, the fluid is ejected to a wide range of the optical surface 11.

(2) The pump 22 continuously supplies fluid to the nozzle 24 so that the fluid is ejected to a wide range of the optical surface. This improves the cleaning effect. In addition, when the fluid is ejected as the position of the ejection axis changes, if a piston pump (pump configured to intermittently eject fluid) is used as the pump 22, there are times during which the fluid is not ejected, and, at those times, the fluid is not ejected to part of the optical surface. The pump 22 continuously supplies the fluid to the nozzle 24 so that the fluid is ejected from the nozzle 24 without interruption.

(3) The nozzle 24 is configured by the single ejection port 32a. This limits complications in (simplifies) the configuration of the nozzle 24. In addition, the fluid can be ejected from the ejection port 32a at a high pressure or a great flow rate.

(4) The nozzle 24 pivots forwardly and reversely so that the nozzle 24 reciprocally swings above the optical surface 11. Thus, the fluid is ejected to a necessary portion (predetermined range H).

(5) The nozzle 24 is pivoted by driving power of the driver 26, so that the pivoting of the nozzle 24 is ensured. Further, when the nozzle 24 is pivoted by the driver 26, the position of the ejection axis of the ejection port 32a changes so that the fluid is ejected to a wide range of the optical surface 11.

(6) The driver 26 includes the motor 41, which corresponds to a driving source that drives to produce rotation, and the speed reduction mechanism 42 that transmits the driving power of the motor 41 to the nozzle 24. Thus, the nozzle 24 is pivoted at a low speed with high torque in relation to the motor 41. In addition, the rated output of the motor 41 is reduced. Thus, a small motor may be used.

(7) The driver 26 and the nozzle 24 are disposed at a vertical upper side of the on-board optical sensor 10. Thus, the air, which corresponds to fluid, is ejected toward the optical surface 11 located at a vertical lower side. Thus, gravitational force is also used to remove objects from the optical surface 11 toward the vertical lower side.

(8) The guide walls 51 are provided to guide the air (fluid) ejected from the nozzle 24 to the optical surface 11. Thus, the fluid is guided to the convex optical surface 11 so that the optical surface 11 is cleaned with the fluid.

(9) The guide walls 51 are flush with the optical surface 11. This further ensures that the air ejected from the nozzle 24 is guided to the optical surface 11.

(10) The nozzle cover 52 is provided to cover the nozzle 24 in a range excluding the ejection axis SL of the air (fluid) ejected from the nozzle 24. In other words, the nozzle cover 52 does not extend in a position intersecting the ejection axis SL. Thus, while covering the nozzle 24 with the nozzle cover 52, hindrance of ejection of fluid from the nozzle 24 is limited. More specifically, hindrance of ejection of fluid caused by collection of an object on the nozzle 24 is limited.

(11) The flow passage P2 configured to draw in the fluid is disposed in the center axis CL, which is the pivot center of the nozzle 24. This limits increases in the size in a direction orthogonal to the pivot center.

(12) The single nozzle 24 is pivoted with the single motor 41 instead of multiple motors. This simplifies the configuration and control of the motor 41.

Second Embodiment

A second embodiment of an on-board sensor cleaning device will now be described with reference to FIGS. 6 to 8.

Figure 6:
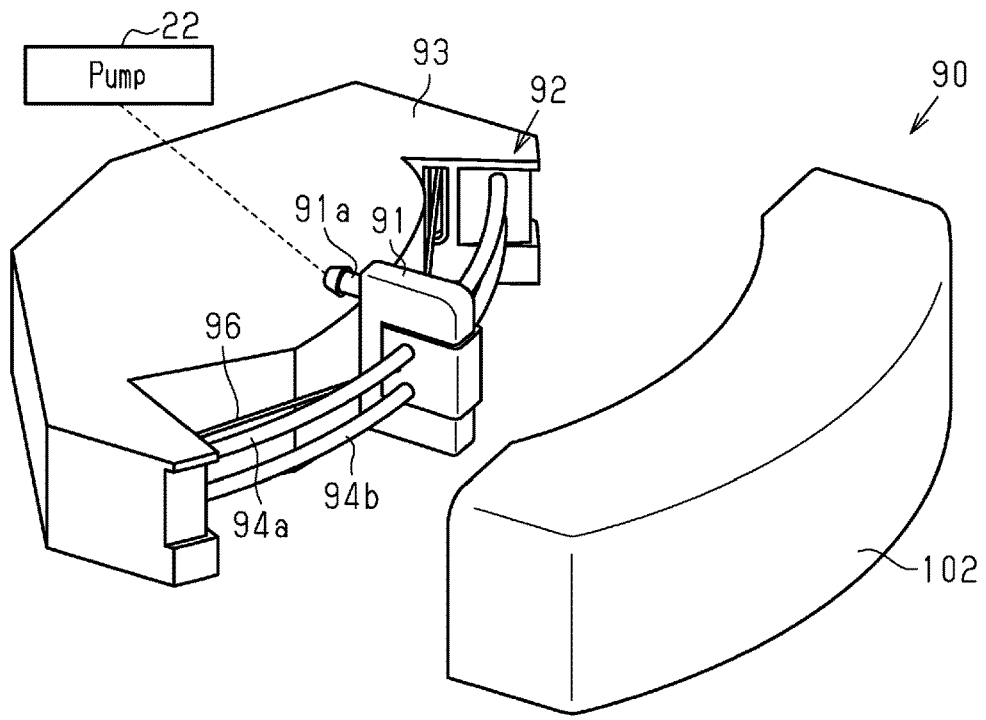
FIG. 6 is a perspective view showing a second embodiment of an on-board sensor cleaning device.
Figure 7:
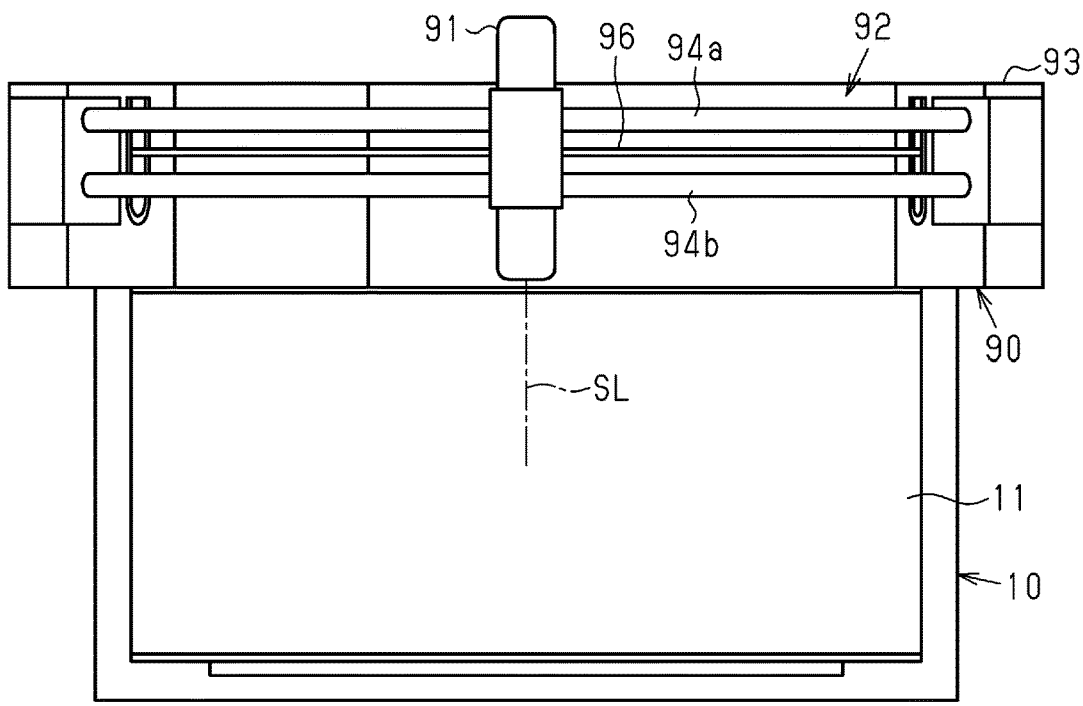
FIG. 7 is a front view of a sensor system including the on-board sensor cleaning device shown in FIG. 6.
Figure 8:
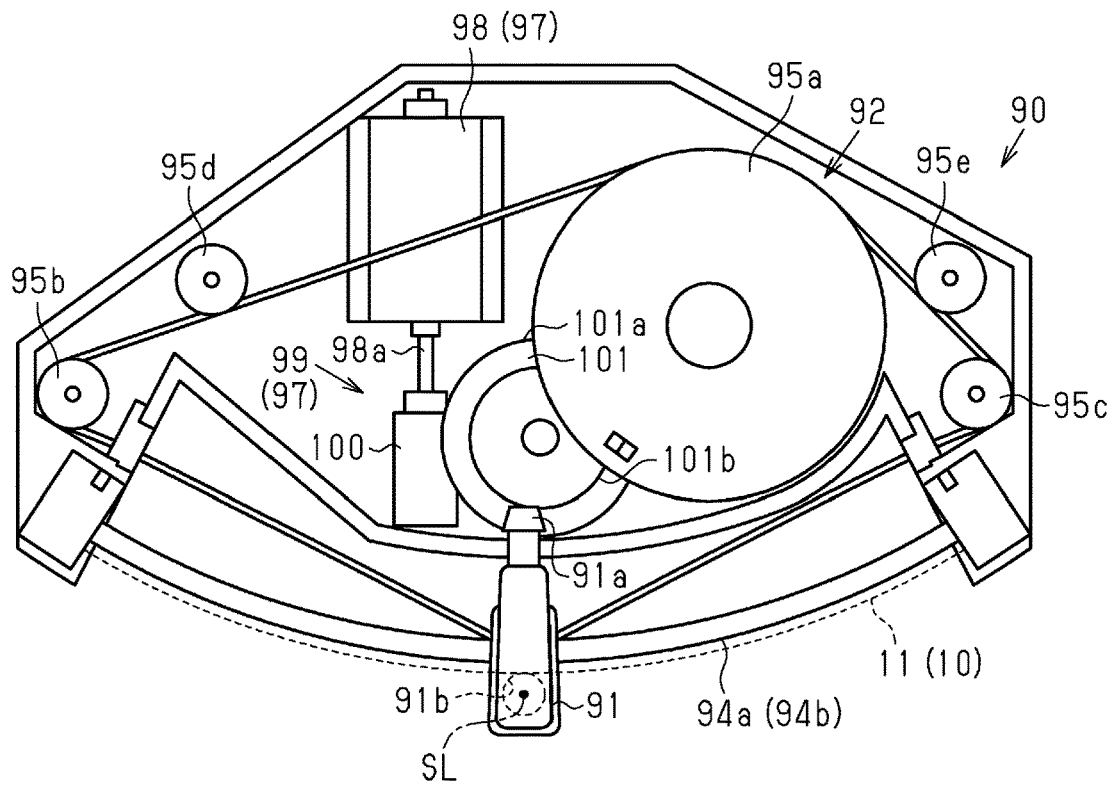
FIG. 8 is a top view of the on-board sensor cleaning device shown in FIG. 6.

As shown in FIGS. 6 to 8, an on-board sensor cleaning device 90 of the present embodiment uses a slide mechanism 92 that allows a nozzle 91 (movable nozzle) to slide.

As shown in FIGS. 6 and 8, the nozzle 91 has a rear portion including a connector 91a connectable to the pump 22. The pump 22 is connected to the connector 91a via a hole that is not shown in the drawings. A flow passage extends in the nozzle 91. The fluid (air) supplied from the pump 22 flows through the flow passage and is ejected from an ejection port 91b.

As shown in FIGS. 6 to 8, the slide mechanism 92 includes two guide rails 94a and 94b supported by a housing 93, multiple pulleys 95a to 95e, a wire 96 running on the pulleys 95a to 95e, and a driver 97 that moves the wire 96, which drives and rotates the pulleys 95a to 95e.

The guide rails 94a and 94b are disposed along the optical surface 11 of the on-board optical sensor 10. The guide rails 94a and 94b are disposed next to each other and spaced apart in the upper-lower direction. The housing 93 supports opposite sideward ends of the guide rails 94a and 94b.

The driver 97 includes a motor 98 and a speed reduction mechanism 99. The speed reduction mechanism 99 includes a worm 100 disposed on an output shaft 98a of the motor 98 and a first gear 101 including a worm wheel 101a that engages the worm 100. The first gear 101 includes a small diameter gear 101b that rotates coaxially and integrally with the worm wheel 101a. The small diameter gear 101b is configured to engage a gear (not shown) that rotates coaxially and integrally with a drum pulley 95a. When the output shaft 98a of the motor 98 is driven to rotate, the rotational driving power is transmitted to the drum pulley 95a to rotate (turn) the drum pulley 95a.

The pulleys 95a to 95e include the drum pulley 95a, guide pulleys 95b and 95c, and two tension pulleys 95d and 95e. The drum pulley 95a is configured to roll up the wire 96 and feed the wire 96 as the drum pulley 95a rotates. The guide pulleys 95b and 95c are individually disposed at opposite sides of the drum pulley 95a in the sideward direction. Each of the tension pulleys 95d and 95e is disposed between the drum pulley 95a and the corresponding one of the guide pulleys 95b and 95c and applies an appropriate tension to the wire 96 so that the wire 96 does not become slack.

The wire 96 is connected to the nozzle 91. Thus, for example, when the drum pulley 95a rotates, the drum pulley 95a rolls up the wire 96 from one side in the sideward direction and feeds the wire 96 to the other side in the sideward direction. The wire 96 moves in the sideward direction, and the nozzle 91 slides along the guide rails 94a and 94b. The wire 96 is disposed between the guide rails 94a and 94b in the vertical direction. When the wire 96 is moved, the nozzle 91 stably moves along the guide rails 94a and 94b.

As shown in FIG. 6, a nozzle cover 102 is disposed in front of the nozzle 91 to cover the nozzle 91 and limit exposure of the nozzle 91 to the exterior. The nozzle cover 102 is configured not to interfere with the movement range of the nozzle 91. The nozzle cover 102 disposed as described above hampers direct contact of an incoming object with the nozzle 91 in the movement range.

The on-board sensor cleaning device 90 having the configuration described above drives the pump 22 to eject fluid (air) from the ejection port 91b of the nozzle 91 while allowing the nozzle 91 to slide along the guide rails 94a and 94b of the slide mechanism 92. Thus, the fluid is ejected to a wide range of the optical surface 11.

The on-board sensor cleaning device 90 having the configuration described above has the following advantages in addition to advantages (1) to (3) of the first embodiment.

(13) The position of the ejection axis SL of the ejection port 91b is changed in accordance with the sliding along the optical surface 11. Thus, the fluid is ejected to a wide range of the optical surface 11.

The first and second embodiments may be modified as follows.

Although not particularly described in the embodiments, the configuration may include a controller that changes moving speed (pivot speed) of the ejection axis SL of the nozzles 24 and 91.

Figure 14:
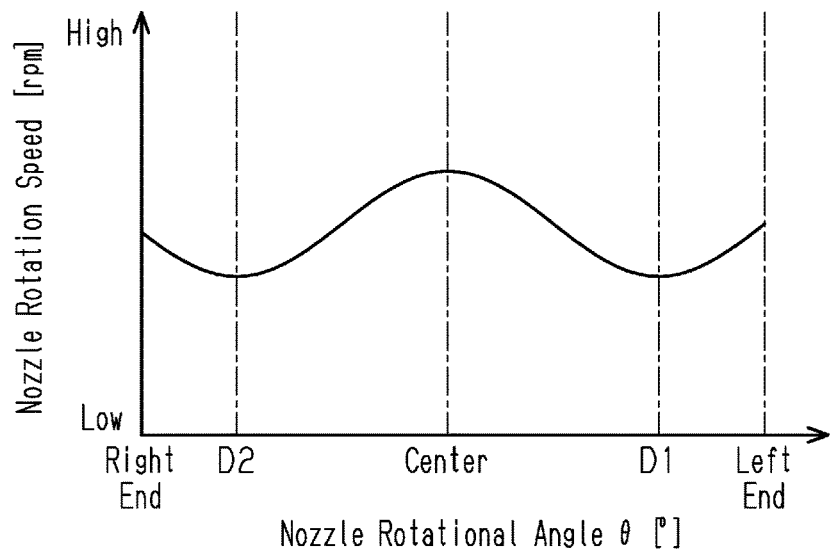
FIG. 14 is a chart showing pivot speed of the nozzle in a modified example.

An example of control may reduce the pivot speed of the nozzle 24 as the distance on the optical surface 11 in the direction of the ejection axis SL increases. More specifically, the pivot speed of the nozzle 24 may be reduced as the cleaning subject region on the optical surface 11 is located further from the movable nozzle in the direction of the ejection axis. FIG. 14 shows an example of the first embodiment including an example of such control.

As shown in FIG. 14, a point D1 located between the center and the left end in a swing range H of the nozzle 24 and a point D2 located between the center and the left end in the swing range H are located at the farthest positions of the optical surface 11 (positions extending through left and right ends of lower circle of the optical surface 11) from the nozzle 24. As described above, when the driver 26 (motor 41) is controlled to reduce the pivot speed of the nozzle 24 as the distance on the optical surface 11 increases in the direction of the ejection axis SL, the time in which the fluid is ejected toward portions distant from the nozzle 24 is increased. More specifically, when the pivot speed of the driver 26 is controlled to control the pivot speed of the ejection axis SL over the optical surface 11, the pivot speed may be changed based on differences such as a portion that is not readily reached by the fluid and a portion readily reached by the fluid.

In addition, ejection priority of the optical surface 11 may be set so that the moving speed (pivot speed) of the nozzles 24 and 91 is reduced as the ejection priority becomes higher, and the pivot speed of the nozzles 24 and 91 is increased as the ejection priority becomes lower. The process for setting the priority may be, for example, a process in which the user changes the priority in any manner or a process that appropriately sets the priority in accordance with positions of a light emitting unit and a light receiving unit in the on-board sensor cleaning device. As described above, when the motors 41 and 98 are controlled so that the moving speed (pivot speed) of the nozzles 24 and 91 is reduced in accordance with regions given higher ejection priorities, the fluid is appropriately ejected to portions with high priority.

In the embodiments, the nozzles 24 and 91 are configured to eject air as fluid. However, there is no limit to such a configuration. For example, the configuration may include a liquid nozzle configured to eject liquid as fluid. FIGS. 9 to 13 show an example of the first embodiment including such a configuration.

Figure 9:
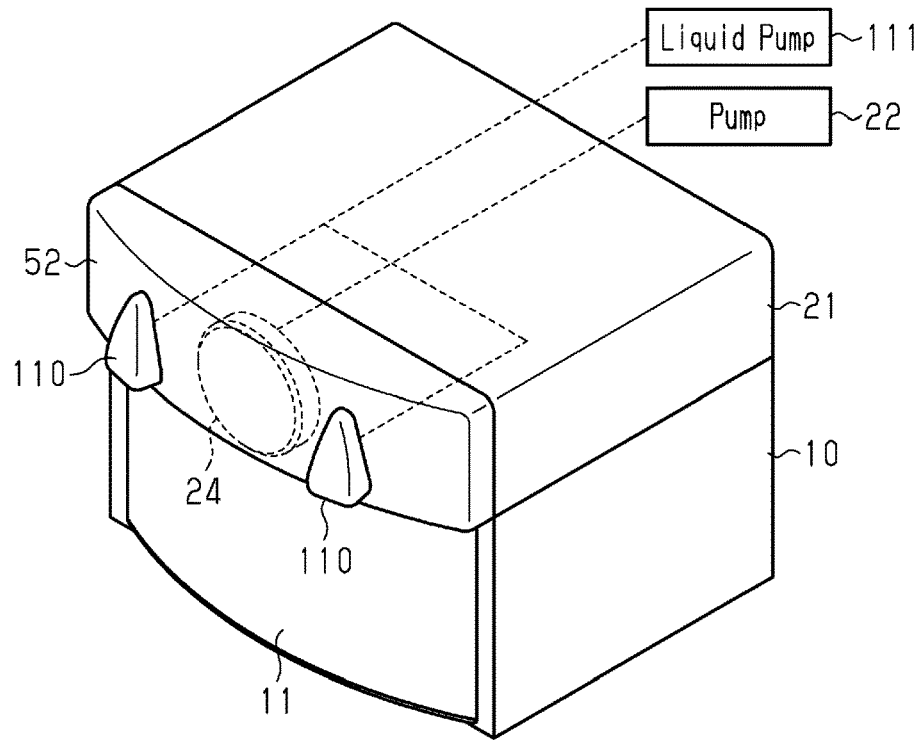
FIG. 9 is a perspective view of a sensor system including an on-board sensor cleaning device in a modified example.
Figure 10:
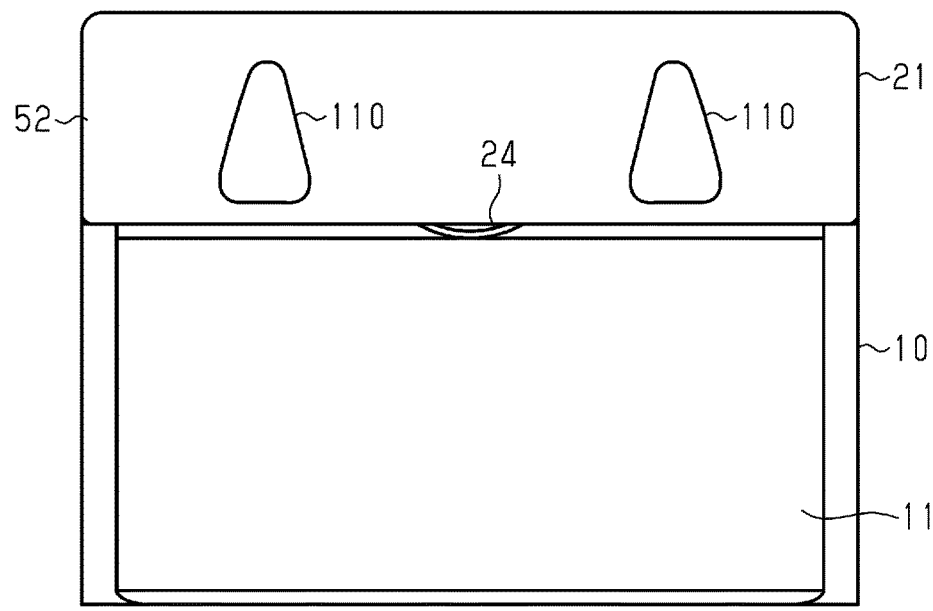
FIG. 10 is a front view of the sensor system shown in FIG. 9.
Figure 11:
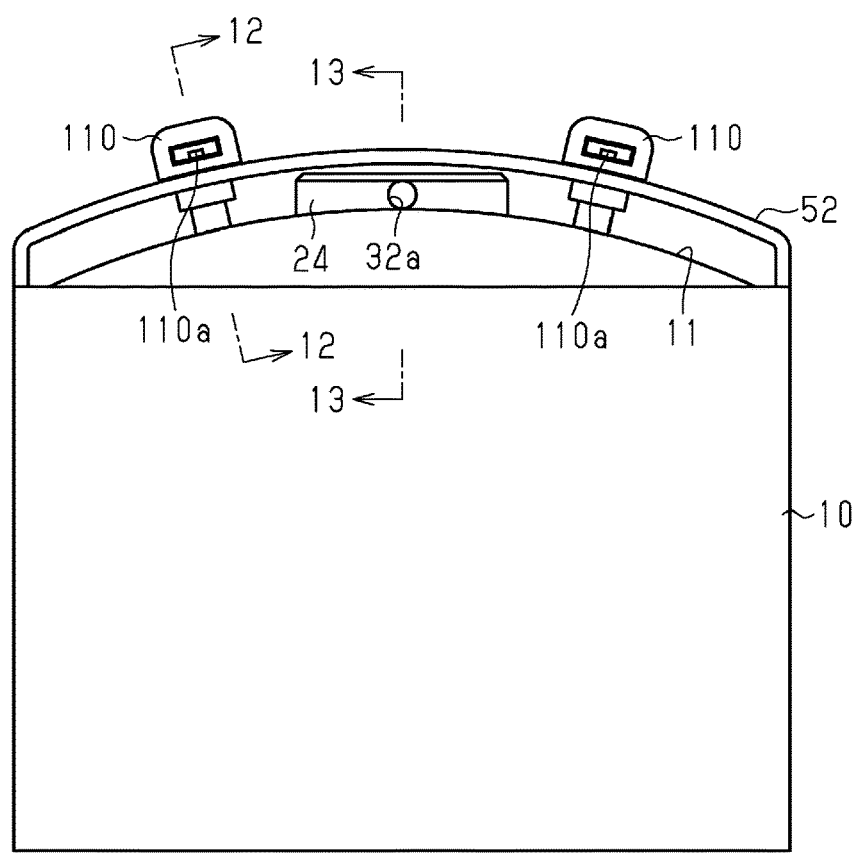
FIG. 11 is a plan view of the sensor system shown in FIG. 9.

As shown in FIGS. 9 to 11, liquid nozzles 110 are individually disposed at opposite sides of the nozzle 24 in the sideward direction. The liquid nozzles 110 differ from the nozzle 24 and are configured to be non-pivotal. Each of the liquid nozzles 110 includes an ejection port 110a and is connected to a liquid pump 111, which differs from the pump 22, so that liquid is ejected from the ejection port 110a. An example of liquid supplied from the liquid pump 111 is washer liquid for cleaning a vehicle front window or the like.

Figure 12:
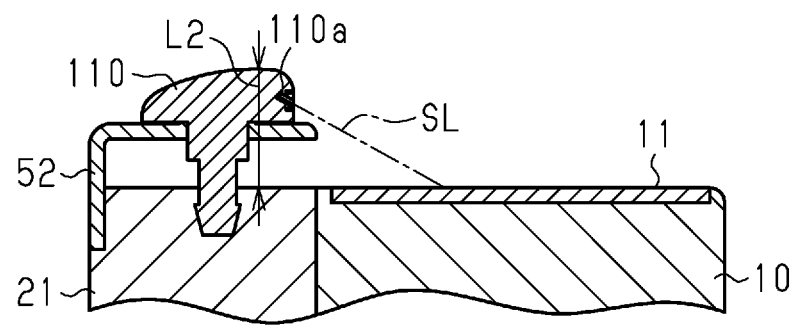
FIG. 12 is a cross-sectional view taken along line 12-12 in FIG. 11.
Figure 13:
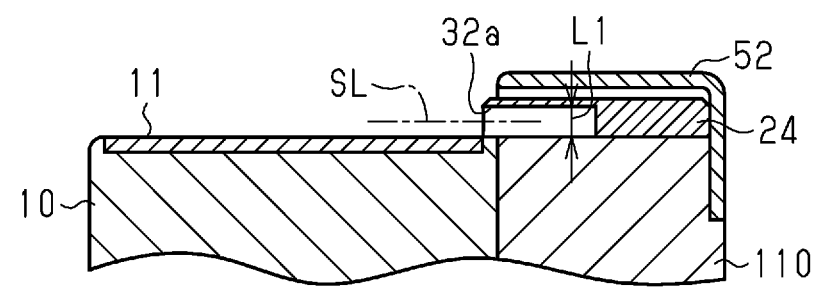
FIG. 13 is a cross-sectional view taken along line 13-13 of FIG. 11.

The liquid nozzles 110 are configured to project frontward from the nozzle cover 52 and be exposed to the exterior. As shown in FIGS. 12 and 13, a projection amount L2 of the liquid nozzles 110 projecting from the optical surface 11 in a direction orthogonal to the surface is greater than a projection amount L1 of the nozzle 24 projecting from the optical surface 11 in a direction orthogonal to the surface. In other words, the projection amount L1 of the nozzle 24 projecting from the optical surface 11 in the direction orthogonal to the surface is less than the projection amount L2 of the liquid nozzle projecting from the optical surface in the direction orthogonal to the surface.

Thus, as shown in FIGS. 12 and 13, while the ejection axis SL of the nozzle 24 is relatively parallel to the optical surface 11, the ejection axis SL of the liquid nozzles 110 is relatively inclined from the optical surface 11 by a predetermined angle.

The configuration described above has the following advantages.

(14) The liquid nozzles 110 are included in addition to the nozzle 24 ejecting air. Thus, cleaning using liquid may be performed.

(15) Since the liquid nozzles 110 are disposed at opposite sides of the nozzle 24, the nozzle 24 pivots and ejects fluid (air) toward regions corresponding to as the liquid nozzles 110. The projection amount L1 of the nozzle 24 projecting from the optical surface 11 in the direction orthogonal to the surface is less than the projection amount L2 of the liquid nozzles 110 projecting from the optical surface 11 in the direction orthogonal to the surface. Thus, air ejected from the nozzle 24 may move along the optical surface 11 and blow off an object such as water droplets from the optical surface 11.

(16) The ejection axis SL of the liquid nozzle 110 is configured to intersect the optical surface 11. Thus, the liquid (washer liquid) ejected from the liquid nozzles 110 strikes the optical surface 11 and disperses so that the liquid is supplied to a wide range of the optical surface 11 and cleans the wide range of the optical surface 11.

In the above example, two liquid nozzles 110 are included. However, the number of liquid nozzles 110 may be changed to one or three or more. The layout of the nozzles 110 is not limited to opposite sides of the nozzle 24 and may be changed. For example, multiple nozzles may be disposed at only one side of the nozzle 24 in the sideward direction. When the liquid nozzles 110 are disposed at opposite sides of the nozzle 24, the number of liquid nozzles 110 disposed at one side of the nozzle 24 may differ from the number of liquid nozzles 110 disposed at the other side of the nozzle 24. In the above example, the liquid nozzles 110 are included in addition to the nozzle 24. However, air nozzles that eject gas (air) may be included other than the liquid nozzles 110.

Preferably, when the second embodiment, in which the nozzle 91 slides along the planar direction of the optical surface 11, includes a liquid nozzle, the liquid nozzle is disposed at a position that does not interfere with the movement range of the nozzle 91.

Figure 15:
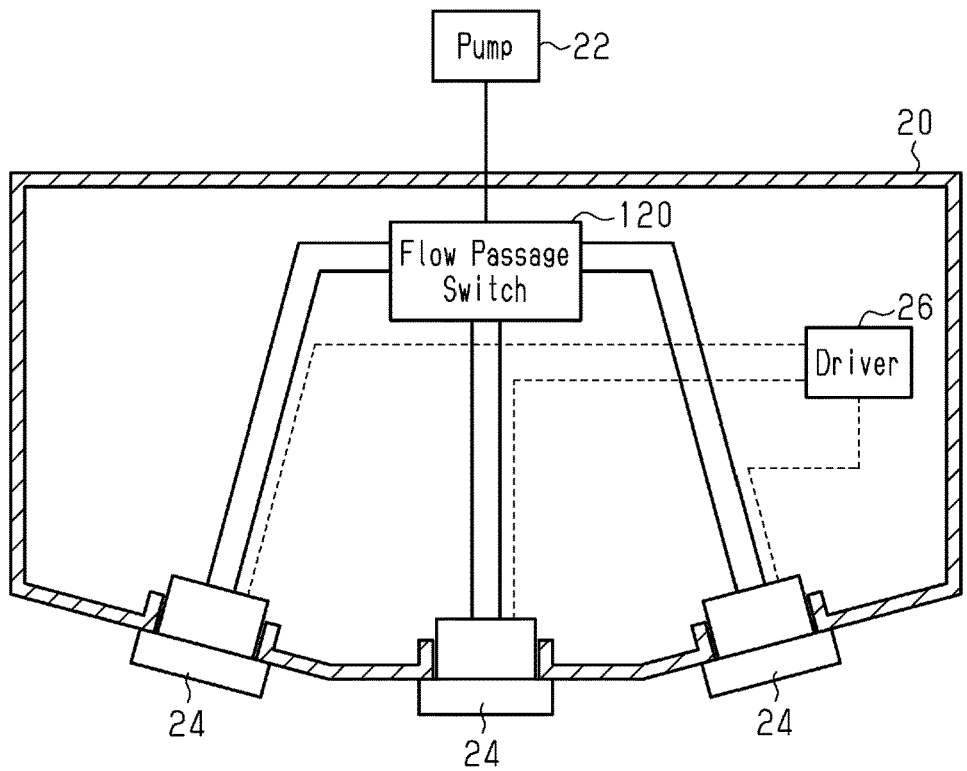
FIG. 15 is a schematic configuration of an on-board sensor cleaning device in a modified example.

In the embodiments, a single nozzle 24 or 91 is included as a movable nozzle. Instead, multiple nozzles may be included. FIG. 15 shows an example of the first embodiment including such a configuration.

As shown in FIG. 15, the on-board sensor cleaning device 20 includes three nozzles 24. The nozzles 24 are supplied with fluid (air) from the pump 22 via a flow passage switch 120. The flow passage switch 120 is, for example, configured to switch the flow passages extending between the pump 22 and the nozzles 24 so that the fluid is sequentially ejected from the three nozzles 24. Thus, the fluid is sequentially ejected from each nozzle 24. The three nozzles 24 are connected to the driver 26 and configured to pivot. The driver 26 that pivots the three nozzles 24 may be configured so that driving power of a single driving source (motor 41) is transmitted to each nozzle 24 and pivots the nozzle 24.

In the embodiments, the nozzle 24, which is a movable nozzle, includes the single ejection port 32a. Instead, the nozzle 24 may include multiple ejection ports. An example of the first embodiment configured to include multiple ejection ports will now be described with reference to FIGS. 16 to 18.

Figure 17:
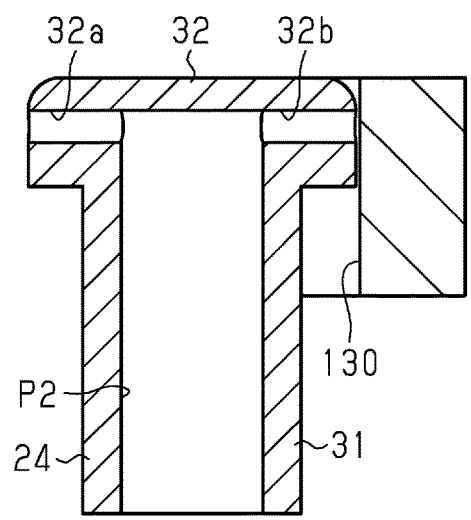
FIG. 17 is a cross-sectional view taken along line 17-17 in FIG. 16.
Figure 18A:
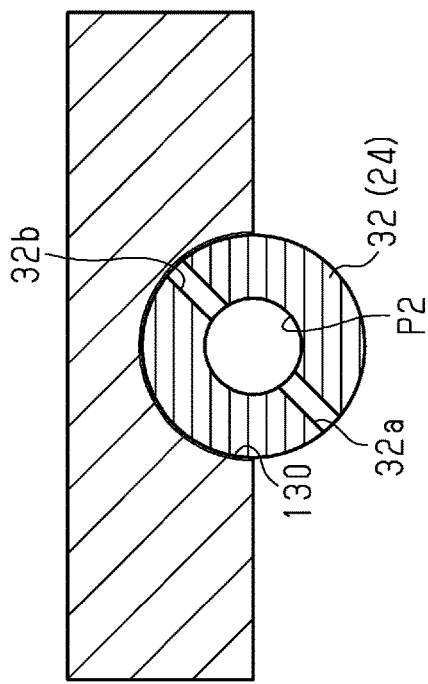
FIGS. 18A-18D are cross-sectional views taken along line 18-18 in FIG. 16.
Figure 18B:
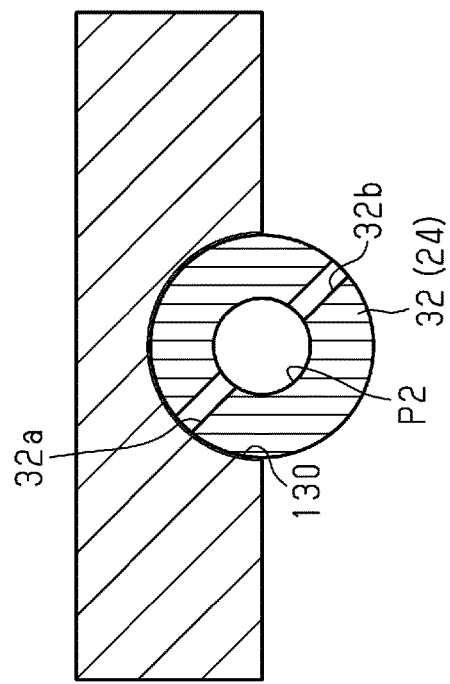
Figure 18C:
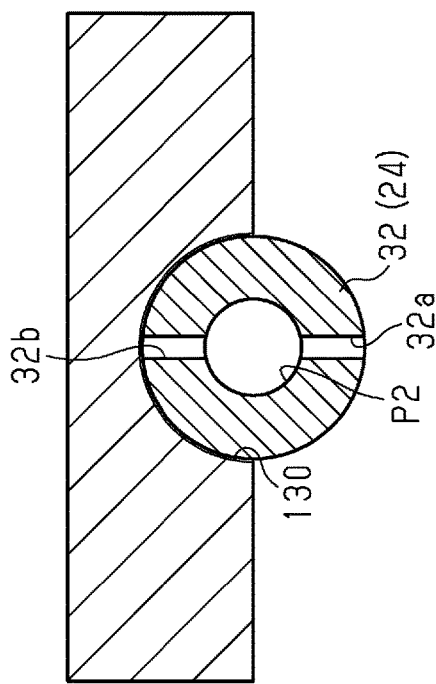
Figure 18D:
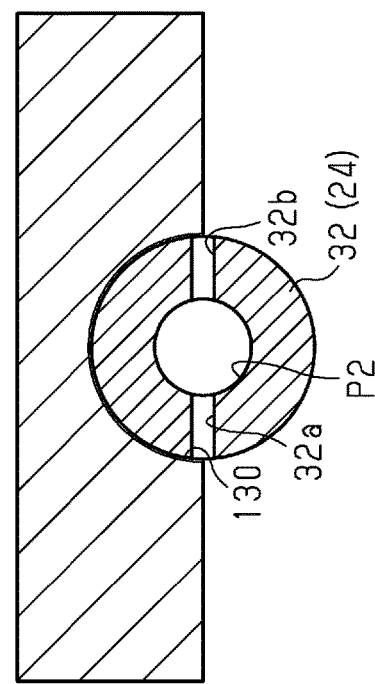

As shown in FIG. 17, the nozzle 24 (body 32) includes two ejection ports 32a and 32b. Each of the ejection ports 32a and 32b are disposed at 180-degree opposite sides of the nozzle 24 in the circumferential direction.

Figure 16:
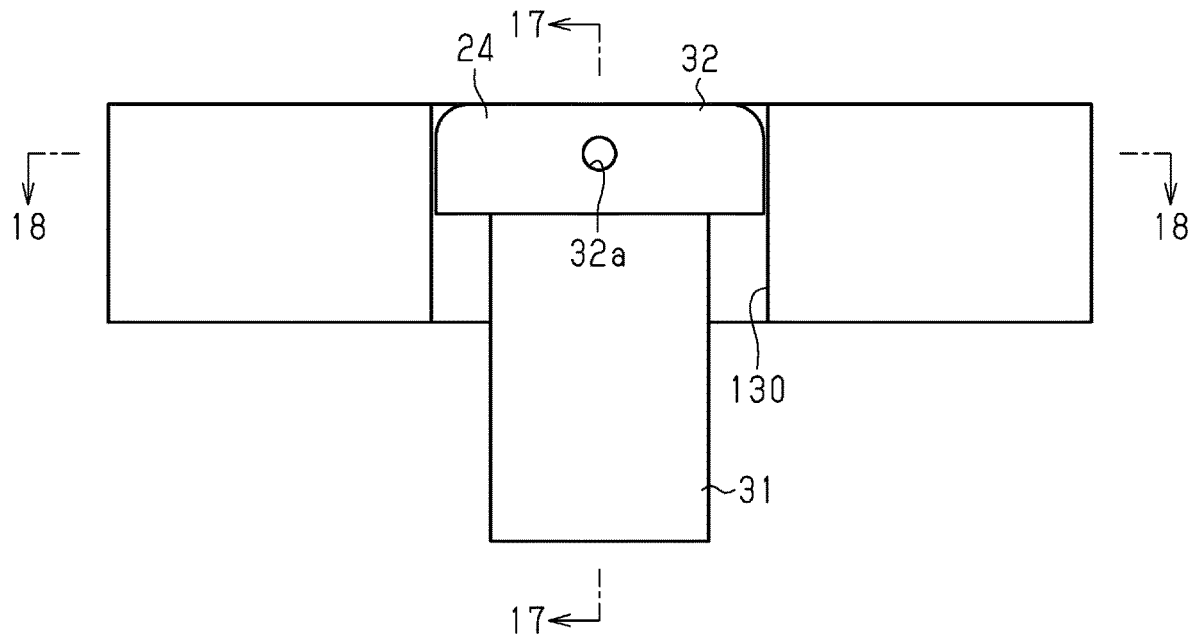
FIG. 16 is a schematic configuration of a nozzle in a modified example.

As shown in FIGS. 16 to 18, a restriction wall 130 is disposed around the body 32 of the nozzle 24 to cover a 180-degree range of the nozzle 24 in the circumferential direction. The restriction wall 130 is configured to constantly oppose one of the two ejection ports 32a and 32b during the pivoting of the nozzle 24 and restrict ejection of fluid from the opposing one of the ejection ports 32a and 32b. In the present example, the portion that is not covered by the restriction wall 130 is the range in which the fluid is actually ejected toward the optical surface 11. The range in which the restriction wall 130 restricts ejection of the fluid is outside the range in which the ejection of fluid toward the optical surface 11 is allowed.

With such a configuration, for example, as shown in FIGS. 18A to 18D, when the nozzle 24 is rotated in one direction, one of the two ejection ports 32a and 32b is exposed to the exterior and able to eject the fluid. As described above, ejection of the fluid from the ejection ports 32a and 32b is restricted at the portion covered with the restriction wall 130. When the restriction wall 130 is disposed around the nozzle 24 to restrict ejection of the fluid from the ejection ports 32a and 32b, ejection of the fluid toward unnecessary portions is limited. More specifically, ejection of the fluid from the ejection ports 32a and 32b is restricted outside the range in which the fluid is ejected toward the optical surface 11 so that ejection of the fluid toward portions other than the optical surface 11 is limited. The fluid is constantly ejected by rotating the nozzle 24 in only one direction. This eliminates the need for, for example, reversal movement of the nozzle 24. Thus, the need for complex control such as switching between forward and reverse rotations of the motor 41 is eliminated. In addition, there is no need to arrange a sensor for detecting a reversal position corresponding to reversal movement (number of rotations produced by the motor 41).

The restriction wall 130 is not limited to a configuration including the multiple ejection ports 32a and 32b and may be used with a nozzle including a single ejection port. Moreover, the pivot direction of the nozzle is not limited to one direction, and the restriction wall 130 may be used with a nozzle that is forwardly and reversely rotated to reciprocally swing. In the above modified example, the restriction wall 130 covers the nozzle 24 in a range of 180 degrees in the circumferential direction. However, the range may be changed.

In the embodiments, the nozzle unit 21 (nozzles 24 and 91) configuring the on-board sensor cleaning device 20 is disposed at a vertical upper side of the on-board optical sensor 10. However, the nozzle unit 21 (nozzles 24 and 91) may be disposed at a vertical lower side of the on-board optical sensor 10 or may be disposed adjacent to the on-board optical sensor 10 in the horizontal direction (sideward direction).

In the embodiments, the nozzle covers 52 and 102 are disposed to cover the nozzles 24 and 91. However, the covers 52 and 102 can be omitted from the configuration. In the embodiments, the optical surface 11 is curved (has a curved surface). However, the optical surface 11 may be, for example, flat.

In the first and second embodiments, each of the drivers 26 and 97 is configured by the single motor 41 or 98 and the speed reduction mechanism 42 or 99. However, there is no limit to such a configuration. For example, the speed reduction mechanisms 42 and 99 may be omitted from the configuration. The configurations of the speed reduction mechanisms 42 and 99, that is, the number of gears and the speed reduction ratio, may be changed.

In the first embodiment, the guide walls 51 are curved and flush with the optical surface 11. However, there is no limit to such a configuration. The optical surface 11 and the guide walls 51 may be configured not to be flush with each other. While the optical surface 11 is curved, the guide walls 51 may be flat. The guide walls 51 may be omitted from the configuration.

In the first embodiment, the nozzle 24 is configured to be rotated by rotational driving power of the motor 41 of the driver 26. Instead, the nozzle 24 may be configured to be pivoted (swung) by the supply of fluid.

In the first embodiment, the flow passage P2 configured to draw in the fluid (air) is provided in the pivot center (center axis CL) of the nozzle 24. Instead, the flow passage P2 may be provided in a position separated from the pivot center (center axis CL) of the nozzle 24.

In the embodiments, a centrifugal pump is used as the pump 22. Instead, an axial-flow pump, a diagonal-flow pump, a diaphragm pump, a screw pump, or other pumps configured to continuously supply fluid may be used.

In the second embodiment, the multiple pulleys 95a to 95e and the wire 96 running on the pulleys 95a to 95e configure the slide mechanism 92. However, there is no limit to such a configuration.

Figure 19:
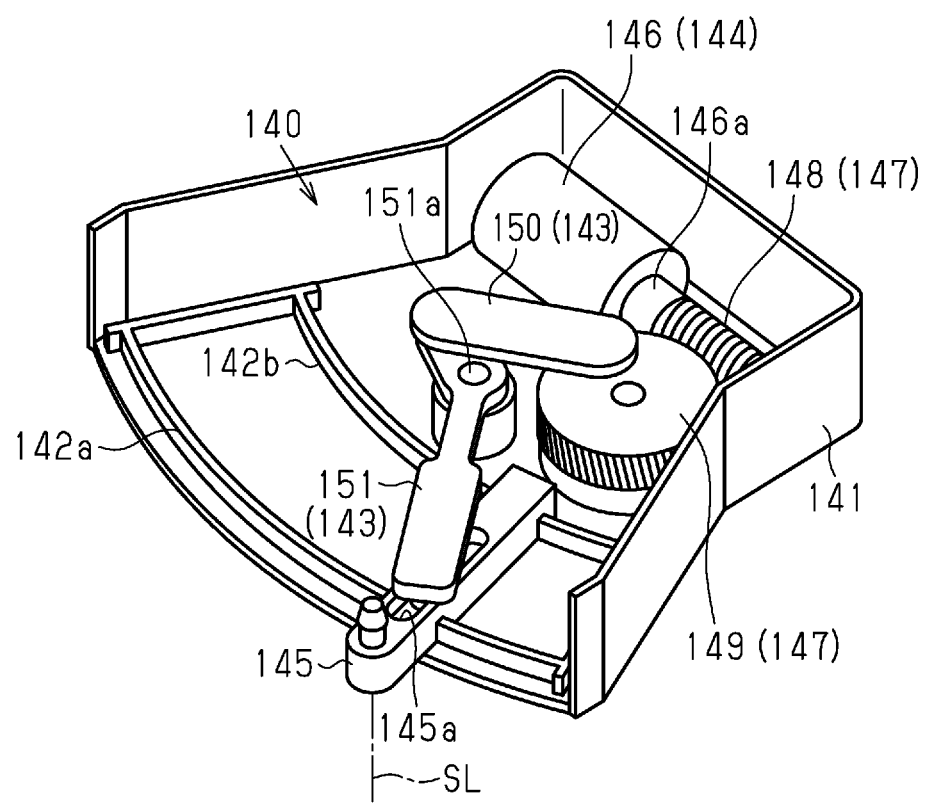
FIG. 19 is a perspective view showing a slide mechanism of a nozzle in a modified example.

FIG. 19 shows a slide mechanism 140 configured to use a slider crank. The slide mechanism 140 includes two guide rails 142a and 142b disposed on a housing 141, a slider crank 143, and a driver 144 that drives the slider crank 143.

The guide rails 142a and 142b are disposed along the optical surface 11 and curved to have substantially the same curvature as the optical surface 11. A nozzle 145 is disposed on the guide rails 142a and 142b so that the nozzle 145 is slidable.

The driver 144 includes a motor 146 and a speed reduction mechanism 147. The speed reduction mechanism 147 includes a worm 148 disposed on an output shaft 146a of the motor 146 and a worm wheel 149 that engages the worm 148.

The slider crank 143 includes a link 150 coupled to the worm wheel 149 on a position separated radially outward from the rotational center and a slider 151 coupled to the link 150. The link 150 has a basal end coupled to the worm wheel 149 and a distal end coupled to the basal end of the slider 151. The slider 151 has the basal end, which is coupled to the link 150, and a distal end coupled to the nozzle 145 so that the distal end is slidable along an elongated hole 145a disposed in the nozzle 145. Also, the slider 151 is pivotally (swingably) supported by a support shaft 151a set between the ends. Thus, for example, when the motor 146 is driven to rotate, the rotational driving power is transmitted so that the slider 151 is pivoted about the support shaft 151a. The support shaft 151a, which is the swing center (rotation center) of the slider 151, is separate from the center of curvature of the guide rails 142a and 142b. Thus, normally, even when the slider 151 swings, the nozzle 145 does not readily swing along the guide rails 142a and 142b. In this regard, in the present example, the nozzle 145 includes the elongated hole 145a so that the distal end of the slider 151 is allowed to move in the longitudinal direction of the elongated hole 145a. Thus, the nozzle 145 swings along the guide rails 142a and 142b.

As described above, when the slider crank 143 is used in the slide mechanism 140, the nozzle 145 swings along the optical surface 11 without forward and reverse rotation of the motor 146.

In the embodiments, the on-board optical sensor 10 (e.g., lidar-type sensor or camera), which is an optical sensor, is used as an on-board sensor. However, there is no limit to such a configuration. An on-board sensor other than the on-board optical sensor 10 (radar using radio waves (e.g., millimeter-wave radar) or ultrasonic sensor used as corner sensor) may be used as the on-board sensor.

The modified examples shown in FIGS. 9 to 13 are configured so that gas is ejected from the nozzle 24 and liquid (washer liquid) is ejected from the liquid nozzles 110. However, the combination may be changed. More specifically, the pivotal nozzle 24 may be configured to eject liquid, and the nozzles 110 may be configured to eject gas. Moreover, the nozzles 24 and 110 may be configured to eject only liquid. The nozzles 24 and 110 may be configured to eject only gas.

The modified examples shown in FIGS. 9 to 13 are configured so that the projection amount L1 of the nozzle 24 projecting from the optical surface 11 in the direction orthogonal to the surface is less than the projection amount L2 of the liquid nozzles 110 projecting from the optical surface 11 in the direction orthogonal to the surface. However, there is no limit to such a configuration. The projection amounts L1 and L2 of the nozzle 24 and the liquid nozzles 110 may be the same. The projection amount L1 of the nozzle 24 may be configured to be less than the projection amount L2 of the liquid nozzles 110.

The embodiments and modified examples described above may be combined in any suitable manner.

Third Embodiment

A third embodiment of an on-board sensor cleaning device will now be described. In the present embodiment, differences from the first embodiment and the second embodiment will mainly be described. The same reference characters are given to those components that are the same as the corresponding components of the first embodiment and the second embodiment. The description of such components will be partially or entirely omitted.

Figure 20:
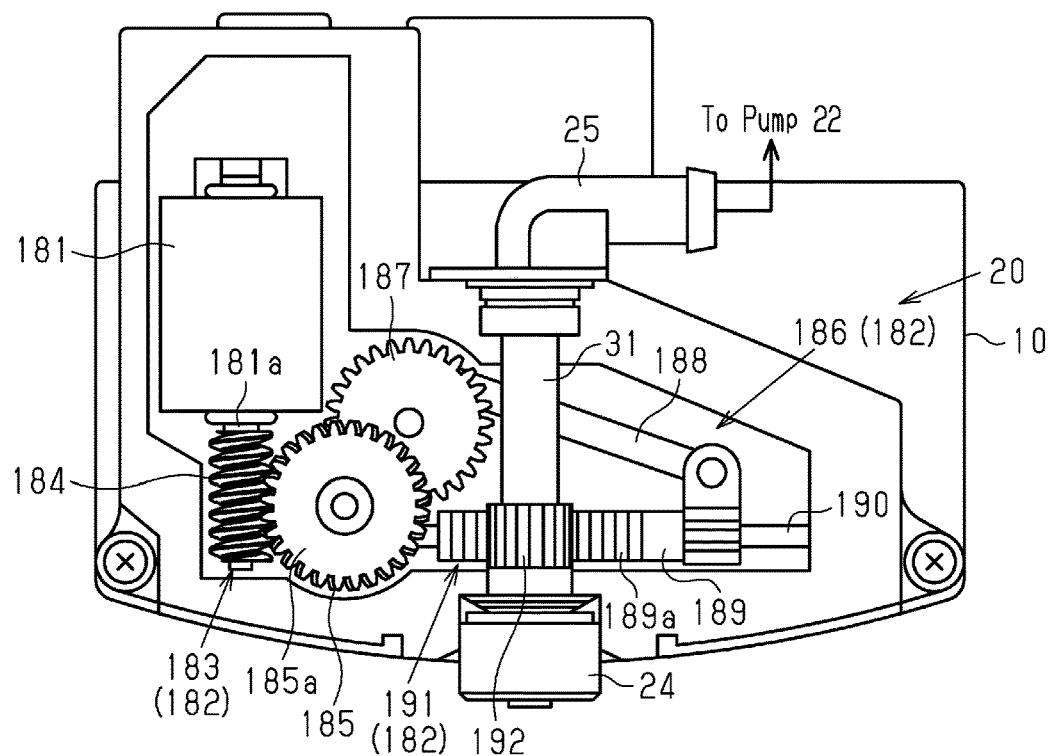
FIG. 20 is a plan view showing a third embodiment of a sensor system.
Figure 21:
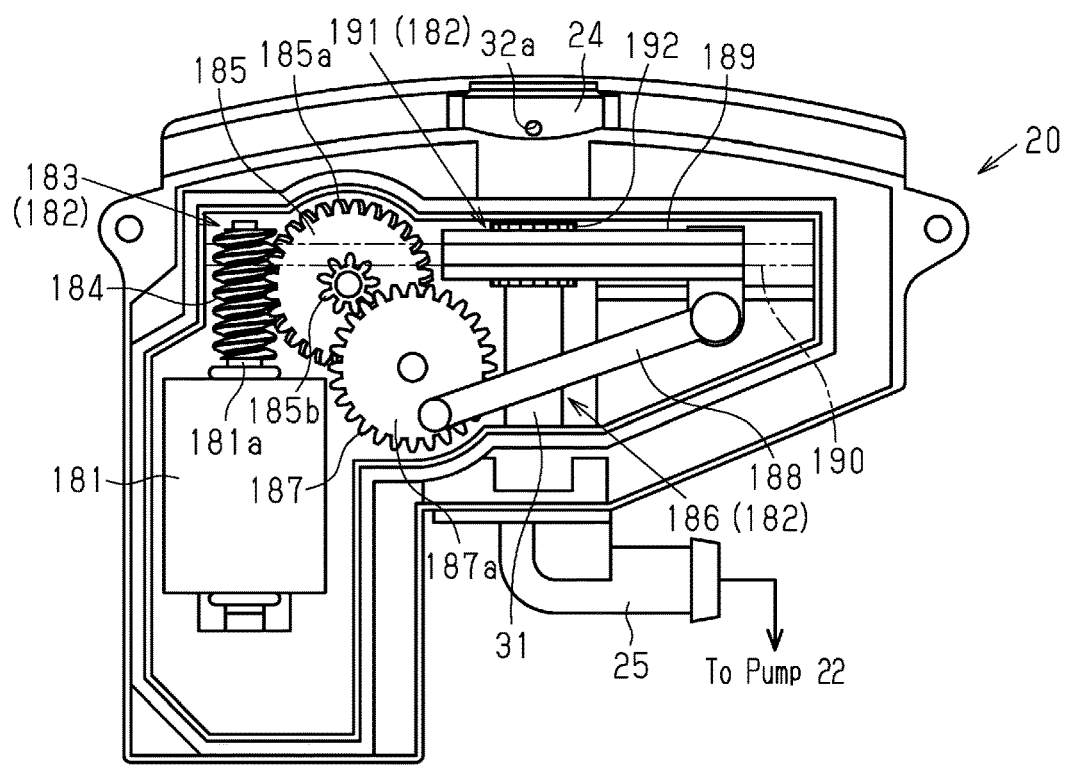
FIG. 21 is a plan view of the on-board sensor cleaning device shown in FIG. 20.
Figure 22:
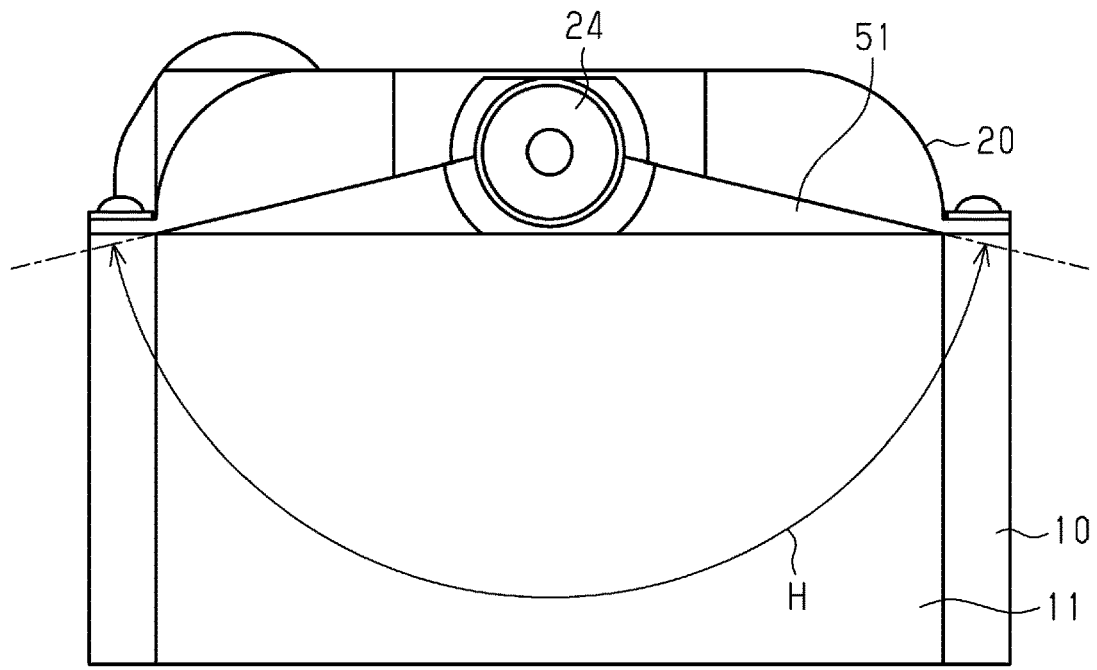
FIG. 22 is a front view of the sensor system shown in FIG. 20.

As shown in FIGS. 20 to 22, an on-board sensor cleaning device 20 includes a nozzle unit 21 mounted on an upper side (vertical upper side of) the on-board optical sensor 10 and a pump 22 (refer to FIG. 1) that supplies fluid to the nozzle unit 21.

The nozzle unit 21 includes a housing 23, a nozzle 24, a connector 25 disposed between the nozzle 24 and the pump 22, and a driver 26 accommodated in the housing 23. The nozzle 24, which corresponds to a movable nozzle, is at least partially exposed frontward from the housing.

The driver 26 includes a motor 181 disposed in the housing 23 and a driving power transmission mechanism 182 that transmits driving power of the motor 181.

The driving power transmission mechanism 182 includes a speed reducer 183, a first motion converter 186, and a second motion converter 191.

The speed reducer 183 includes a worm 184 and a first gear 185. The worm 184 is formed on an output shaft 181a of the motor 181 and engages a worm wheel 185a of the first gear 185. The first gear 185 includes a spur gear 185b configured to be integral with the worm wheel 185a and rotate coaxially and integrally with the worm wheel 185a and having a smaller diameter than the worm wheel 185a. The spur gear 185b engages a second gear 187.

As shown in FIGS. 20 and 21, the first motion converter 186 is a reciprocal slider crank mechanism that converts circular motion (rotation motion) into reciprocal linear motion and includes the second gear 187, a rod member 188 having one end coupled to the second gear 187, and a slider member 189 coupled to the other end of the rod member 188. The second gear 187 is configured by a spur gear. One end of the rod member 188, which is included in the first motion converter 186, is connected to an axial end surface 187a of the second gear 187 at a position separate from the rotational center of the second gear 187. More specifically, the second gear 187 acts as the crank of the reciprocal slider crank mechanism. The other end of the rod member 188 is connected to one end of the slider member 189. The slider member 189 is supported by a guide member 190 that linearly extends in the sideward direction so that the slider member 189 is configured to linearly reciprocate along the guide member 190.

In the first motion converter 186 having the configuration described above, when the second gear 187 is driven and rotated, the driving power is transmitted to the slider member 189 via the rod member 188. The transmitted driving power causes the slider member 189 to linearly reciprocate along the guide member 190 in the sideward direction.

When circular motion (rotation motion) is converted into reciprocal linear motion as described above and the circular motion of the second gear 187 is at a uniform speed, the speed of the slider member 189 after the conversion changes in the same manner as a sine wave (cosine wave).

The second motion converter 191 is configured to convert reciprocal linear motion into circular motion. In the present example, for example, a rack and pinion is used. More specifically, the second motion converter 191 includes the slider member 189 and a pinion gear 192. The slider member 189 corresponds to a rack, and the pinion gear 192 corresponds to a pinion. In other words, the slider member 189 configures both (part of) the first motion converter 186 and the second motion converter 191.

The slider member 189 has a surface including teeth 189a. The teeth 189a of the slider member 189 engage the pinion gear 192 formed on the outer circumferential surface of the tubular portion 31 of the nozzle 24. More specifically, when the slider member 189 linearly reciprocates, the pinion gear 192, which engages the teeth 189a of the slider member 189, rotates, and the nozzle 24 pivots. Since the slider member 189 is configured to linearly reciprocate, forward movement of the slider member 189 causes the pinion gear 192 and the nozzle 24 to rotate in one direction, and reverse rotation of the slider member 189 causes the pinion gear 192 and the nozzle 24 to rotate in the other direction. As described above, the nozzle 24 pivots so that the direction of the ejection port 32a changes in the predetermined range H (refer to FIG. 22).

The operation of the on-board sensor cleaning device 20 will now be described. In the nozzle unit 21 of the on-board sensor cleaning device 20 of the present embodiment, when the motor 181 is driven to produce rotation, the speed reducer 183 converts the rotation into low-speed high-torque rotation. The first motion converter 186 converts the rotation motion into reciprocal linear motion. Further, the second motion converter 191 converts the reciprocal linear motion into rotation motion (reciprocal rotation motion) and transmits the rotational driving power to the nozzle 24. The nozzle 24 pivots in the predetermined range H.

Figure 23:
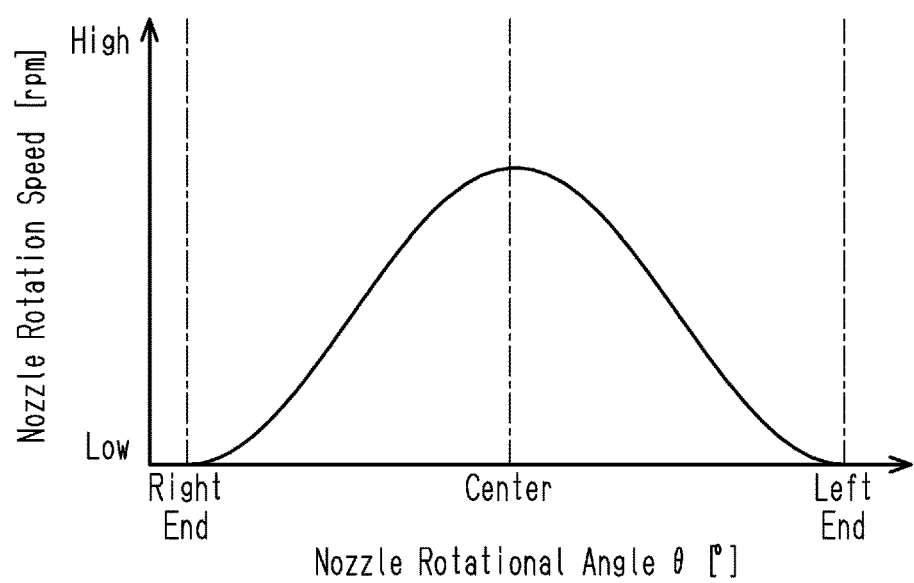
FIG. 23 is a chart showing pivot speed of the nozzle shown in FIG. 20.

At this time, as described above, when uniform-speed rotation motion is converted into reciprocal linear motion, the speed changes in the same manner as a sine wave. Thus, when the configuration of the present example is used so that the output shaft 181a of the motor 181 is driven to rotate (performs rotation motion) at a substantially constant speed, the pivot speed of the nozzle 24 changes in the same manner as a sine wave. More specifically, as shown in FIG. 23, the pivot speed of the nozzle 24 is lowest at positions where forward and reverse rotations of the nozzle 24 are switched (positions where reciprocal motion is switched). The pivot speed of the nozzle 24 is highest when the ejection axis SL of the nozzle 24 is located in the center.

As described above, the optical surface 11 bulges frontward and is curved as viewed in the upper-lower direction. Thus, the change rate of the curve of the optical surface 11 in relation to the ejection axis SL extending on a straight line is greater at a portion where forward and reverse rotations of the nozzle 24 are switched than at other portions. Thus, as described above, the speed of the nozzle 24 is reduced at a portion where forward and reverse rotations of the nozzle 24 are switched so that the target portion of the optical surface 11 is efficiently cleaned.

The advantages of the present embodiment will now be described.

(16) The first motion converter 186 and the second motion converter 191 are included as a conversion mechanism that converts mono-directional rotation motion of the motor 181 into reciprocal rotation motion. This allows the nozzle 24 to reciprocally rotate (reciprocally pivot) in a predetermined range without switching between forward and reverse rotations of the motor 181. The first motion converter 186 converts rotation motion into reciprocal linear motion once so that when the second motion converter 191 converts the reciprocal linear motion into rotation motion, the rotation motion is automatically reciprocal. Thus, the nozzle 24 reciprocally rotates (reciprocally pivots) in a predetermined range without switching between forward and reverse rotations of the motor 181.

(17) A reciprocal slider crank mechanism is used as the first motion converter 186 to ensure that rotation motion is converted into reciprocal linear motion.

The third embodiment may be modified as follows.

Although not particularly described in the embodiments, the configuration may include a controller that controls rotation speed of the driver 26 (motor 41) to control pivot speed (rotation speed) of the nozzle 24 so that pivot speed of the ejection axis SL over the optical surface 11 changes.

In the third embodiment, a slider crank mechanism is used as the first motion converter 186. However, there is no limit to such a configuration. For example, the configuration shown in FIG. 24 or the configurations shown in FIGS. 25 and 26 may be used.

Figure 24:
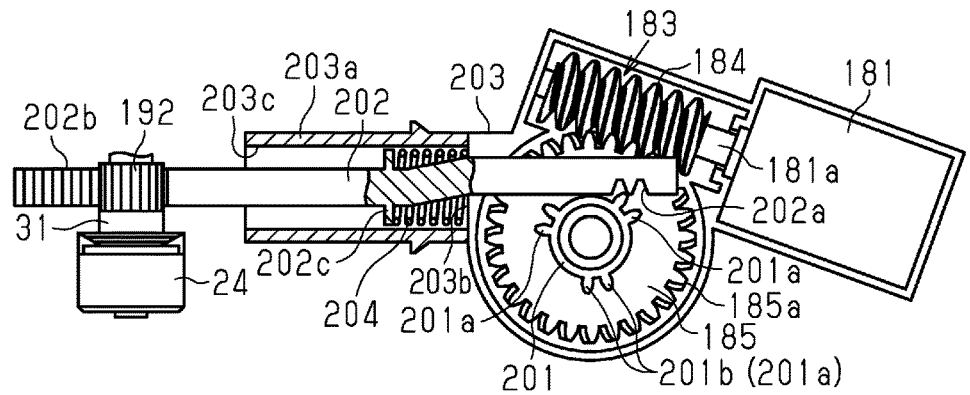
FIG. 24 is a plan view of an on-board sensor cleaning device in a modified example.

As shown in FIG. 24, a first motion converter includes a small diameter gear 201 and a slider member 202 that engages the small diameter gear 201. The small diameter gear 201 is configured to be integral with the worm wheel 185a of the speed reducer 183 and rotate coaxially and integrally with the worm wheel 185a. The small diameter gear 201 has a smaller diameter than the worm wheel 185a.

The small diameter gear 201 is configured to include three circumferentially equidistant teeth units 201a, each of which has two gear teeth 201b.

The slider member 202 is supported to reciprocate in a cylinder 203a formed integrally with a motor retainer 203. The motor retainer 203 configures, for example, a portion of the housing 23 and accommodates the motor 181.

The slider member 202 has one end including teeth 202a that engage the gear teeth 201b of the teeth units 201a and the other end including teeth 202b that engage the pinion gear 192. In addition, a portion of the slider member 202 is accommodated (inserted) in the cylinder 203a and includes a flange 202c at a longitudinal intermediate position. A spring 204 is provided between the flange 202c and a wall end 203b of the cylinder 203a. The spring 204 urges the flange 202c toward an opening 203c, opposite to the wall end 203b of the cylinder 203a.

In this case, for example, when the output shaft 181a of the motor 181 is driven to rotate in one direction, the small diameter gear 201 rotates in one direction. At this time, when the teeth 202a of the slider member 202 engage the teeth units 201a of the small diameter gear 201, the slider member 202 acts against urging force of the spring 204 and moves in a direction opposite to the spring 204. When rotation of the output shaft 181a of the motor 181 proceeds and the teeth 202a of the slider member 202 are disengaged from the teeth units 201a of the small diameter gear 201, the urging force of the spring 204 moves the slider member 202 in a direction in which the spring 204 urges. Repetition of such movement results in reciprocal linear motion of the slider member 202. When the slider member 202 linearly reciprocates, the pinion gear 192, which engages the teeth 202b of the slider member 202, rotates, and the nozzle 24 pivots.

Figure 25:
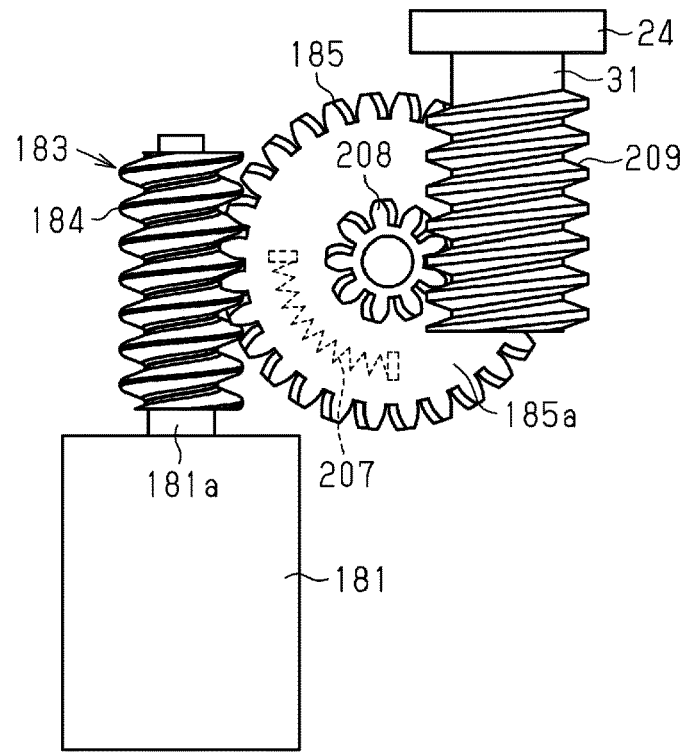
FIG. 25 is a plan view of an on-board sensor cleaning device in a modified example.
Figure 26:
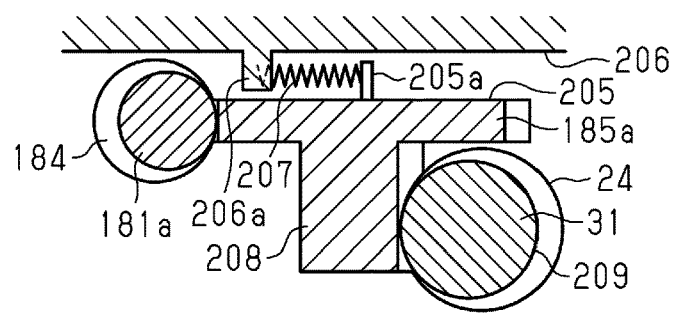
FIG. 26 is a cross-sectional view of the on-board sensor cleaning device shown in FIG. 25.

In the configurations shown in FIGS. 25 and 26, the worm wheel 185a includes an axial end surface 205 including a spring support 205a that supports an end of a spring 207. A spring support 206a that supports the other end of the spring 207 is disposed between the spring support 205a and a motor retainer 206 that configures a portion of the housing 23 and accommodates the motor 181. This obtains a configuration in which the spring 207 produces urging force in a direction opposite to the driving direction of the motor 181. In addition, a bevel gear (worm wheel) configures a small diameter gear 208 configured to be integral with the worm wheel 185a and rotate coaxially and integrally with the worm wheel 185a and having a smaller diameter than the worm wheel 185a. The worm wheel 185a engages a worm 209 formed on the tubular portion 31 of the nozzle 24. The output shaft 181a of the motor 181 is driven to rotate against the urging force of the spring 207 in one direction so that the nozzle 24 pivots in one direction. When the motor 181 is deactivated, the urging force of the spring 207 causes the nozzle 24 to pivot in the other direction.

The embodiments and modified examples described above may be combined in any suitable manner.

The invention claimed is:

1. An on-board sensor cleaning device for an on-board sensor including a sensing surface, the on-board sensor cleaning device comprising:
    an ejection port configured to eject fluid toward the sensing surface when the ejection port is outside a sensing range of the on-board sensor; and
    a movable nozzle configured to move the ejection port so that a position of an ejection axis of the ejection port changes,
    wherein the movable nozzle is configured to pivot about a pivot axis extending in a direction orthogonal to the sensing surface when the ejection port is ejecting the fluid toward the sensing surface.

2. The on-board sensor cleaning device according to claim 1, further comprising a fluid pump that is configured to continuously supply the fluid to the movable nozzle.

3. The on-board sensor cleaning device according to claim 1, wherein the movable nozzle includes a single ejection port.

4. The on-board sensor cleaning device according to claim 1, wherein the movable nozzle includes a plurality of ejection ports.

5. The on-board sensor cleaning device according to claim 1, further comprising a restriction wall around the movable nozzle that is configured to restrict ejection of fluid from the ejection port.

6. The on-board sensor cleaning device according to claim 5, wherein
the movable nozzle is configured to pivot in one direction, and
the restriction wall is configured to oppose the ejection port outside a region in which the ejection of fluid toward the sensing surface is allowed.

7. The on-board sensor cleaning device according to claim 1, wherein the movable nozzle is configured to pivot in forward and reverse directions.

8. The on-board sensor cleaning device according to claim 1, further comprising:
a guide wall configured to guide the fluid ejected from the movable nozzle toward the sensing surface;
wherein the sensing surface is a convex curved surface.

9. The on-board sensor cleaning device according to claim 8, wherein the guide wall is flush with the sensing surface.

10. The on-board sensor cleaning device according to claim 1, further comprising a cover in a range excluding the ejection axis to cover the movable nozzle.

11. The on-board sensor cleaning device according to claim 1, further comprising a driver configured to generate driving power that pivots the movable nozzle.

12. The on-board sensor cleaning device according to claim 11, wherein the driver includes a driving source that is configured to produce rotation of the movable nozzle and a speed reduction mechanism that is configured to transmit the driving power of the driving source to the movable nozzle.

13. The on-board sensor cleaning device according to claim 11, wherein the driver and the movable nozzle are at a vertical upper side of the on-board sensor.

14. The on-board sensor cleaning device according to claim 11, further comprising a controller that is configured to control rotation speed of the driver to change pivot speed of the ejection axis over the sensing surface.

15. The on-board sensor cleaning device according to claim 14, wherein the controller is configured to control the driver so that the pivot speed of the movable nozzle is reduced in regions given higher ejection priorities.

16. The on-board sensor cleaning device according to claim 14, wherein the controller is configured to control the driver so that the pivot speed of the movable nozzle is reduced as a cleaning subject region on the sensing surface is located farther from the movable nozzle in a direction of the ejection axis.

17. The on-board sensor cleaning device according to claim 11, wherein the driver includes a conversion mechanism that is configured to convert mono-directional rotation motion of the driving source into reciprocal rotation motion.

18. The on-board sensor cleaning device according to claim 17, wherein the conversion mechanism includes a first motion converter that is configured to convert the mono-directional rotation motion of the driving source into reciprocal linear motion and a second motion converter that is configured to convert the reciprocal linear motion into the reciprocal rotation motion.

19. The on-board sensor cleaning device according to claim 18, wherein the first motion converter includes a reciprocal slider crank mechanism.

20. The on-board sensor cleaning device according to claim 1, wherein the movable nozzle has a pivot center with a flow passage configured to draw in fluid.

21. The on-board sensor cleaning device according to claim 1, further comprising a slide mechanism that is configured to allow the movable nozzle to slide along the sensing surface, wherein the slide mechanism changes the position of the ejection axis of the ejection port.

22. The on-board sensor cleaning device according to claim 1, wherein the movable nozzle is configured to eject air.

23. An on-board sensor cleaning device for an on-board sensor including a sensing surface, the on-board sensor cleaning device comprising:
an ejection port configured to eject fluid toward the sensing surface when the ejection port is outside a sensing range of the on-board sensor;
a movable nozzle configured to move the ejection port so that a position of an ejection axis of the ejection port changes; and
a liquid nozzle configured to eject liquid toward the sensing surface, wherein
the movable nozzle is configured to pivot about a pivot axis extending in a direction orthogonal to the sensing surface when the ejection port is ejecting the fluid toward the sensing surface, and
the movable nozzle is configured to eject air.

24. The on-board sensor cleaning device according to claim 23, wherein the on-board sensor cleaning device includes a plurality of the liquid nozzle at opposite sides of the movable nozzle.

25. The on-board sensor cleaning device according to claim 23, wherein a first projection length of a projection of the movable nozzle from the sensing surface in a direction orthogonal to the sensing surface is less than a second projection length of a projection of the liquid nozzle projecting from the sensing surface in a direction orthogonal to the sensing surface.

26. The on-board sensor cleaning device according to claim 25, wherein the liquid nozzle is configured to have an ejection axis intersecting the sensing surface.

* * * * *